US012511929B1

(12) United States Patent
Penfield et al.

(10) Patent No.: US 12,511,929 B1
(45) Date of Patent: Dec. 30, 2025

(54) VISION-BASED THREE-DIMENSIONAL HUMAN POSE ESTIMATION SYSTEM AND METHOD FOR ERGONOMIC RISK ASSESSMENT

(71) Applicant: VelocityEHS Holdings Inc, Chicago, IL (US)

(72) Inventors: Julia Penfield, Seattle, WA (US); Veeru Talreja, Morgantown, WV (US); Leyang Wen, Ann Arbor, MI (US); Rick Barker, West Chester, OH (US); Daeho Kim, Toronto (CA); Meiyin Liu, New Brunswick, NJ (US); SangHyun Lee, Ann Arbor, MI (US)

(73) Assignee: VELOCITYEHS HOLDINGS INC., Chicago, IL (US)

( * ) Notice: Subject to any disclaimer, the term of this patent is extended or adjusted under 35 U.S.C. 154(b) by 0 days.

(21) Appl. No.: 19/011,125

(22) Filed: Jan. 6, 2025

(51) Int. Cl.
*G06V 40/10* (2022.01)
*G06T 7/73* (2017.01)
*G06V 10/26* (2022.01)
*G06V 20/40* (2022.01)
*G06V 20/52* (2022.01)

(52) U.S. Cl.
CPC .............. *G06V 40/103* (2022.01); *G06T 7/73* (2017.01); *G06V 10/273* (2022.01); *G06V 20/46* (2022.01); *G06V 20/52* (2022.01); *G06T 2207/30196* (2013.01)

(58) Field of Classification Search
CPC ...... G06V 40/103; G06V 20/52; G06V 20/46; G06V 10/273; G06T 7/73; G06T 2207/30196
USPC .......................................................... 382/103
See application file for complete search history.

(56) References Cited

U.S. PATENT DOCUMENTS

| 11,763,235 B1* | 9/2023 | Penfield ............. G06Q 10/0635 704/9 |
| 2021/0097718 A1* | 4/2021 | Fisch ......................... G06T 7/73 |
| 2022/0386942 A1* | 12/2022 | Diaz-Arias .............. A61B 5/45 |

* cited by examiner

*Primary Examiner* — Kenny A Cese
(74) *Attorney, Agent, or Firm* — K&L Gates LLP

(57) ABSTRACT

Disclosed herein are vision-based three-dimensional (3D) pose estimation system and method for ergonomic risk assessment. An example system may comprise a computing device configured to obtain a monocular video capturing motions of a subject performing at least one working activity for a selected duration of time, perform a whole-body two dimensional (2D) pose estimation based at least on extracted frames of the monocular video, perform a whole-body 3D pose estimation based at least on the whole-body 2D pose estimation, calculate joint angles based at least on the whole-body 3D pose estimation, determine a posture score for each identified joint in each frame of the monocular video, and determine an ergonomic risk level of each identified joint based at least upon the posture score.

16 Claims, 11 Drawing Sheets

| Index | Position | | Body Keypoint |
|---|---|---|---|
| #1 | Center | | Head Center |
| #2 | Center | | Nose |
| #3, #4 | Left | Right | Ear |
| #5 | Center | | Shoulder Center |
| #6, #7 | Left | Right | Shoulder |
| #8, #9 | Left | Right | Elbow |
| #10, #11 | Left | Right | Wrist |
| #12, #13 | Left | Right | Hand |
| #14, #15 | Left | Right | MCP2 |
| #16, #17 | Left | Right | MCP5 |
| #18 | Center | | Hip Center |
| #19, #20 | Left | Right | Hip |
| #21, #22 | Left | Right | Knee |
| #23, #24 | Left | Right | Ankle |

| Joint | Joint Angles From | |
|---|---|---|
| | 24 Keypoints | Human3.6M 17 Keypoints |
| Neck | Flexion (+) / Extension (-) | Essential Keypoints Missing * |
| | Lateral Bend | Essential Keypoints Missing * |
| | Rotation | Essential Keypoints Missing * |
| Shoulder | Humeral Elevation | Humeral Elevation |
| | Horizontal Abduction | Horizontal Abduction |
| Elbow | Flexion | Flexion |
| Wrist | Flexion (+) / Extension (-) | Essential Keypoints Missing |
| | Radial (+) / Ulnar (-) Deviation | Essential Keypoints Missing |
| Back | Flexion (+) / Extension (-) | Flexion (+) / Extension (-) |
| | Lateral Bend | Lateral Bend |
| | Rotation | Rotation |
| Knee | Flexion | Flexion |

*Human3.6M keypoints can calculate one single 3D neck angle but are inadequate in distinguishing between neck flexion, lateral bending, and rotational angles.

FIG. 7

| Joint | Angle | Posture Scores | | | |
|---|---|---|---|---|---|
| | | 0 | +1 | +2 | +3 |
| Neck | Flexion (+) / Extension (-) | [0°, 25°] | [25°, 45°] | [45°, 65°] | [65°, 80°] |
| Shoulder | Humeral Elevation | [0°, 45°] | [45°, 90°] | [90°, 120°] | [120°, 180°] |
| Elbow | Flexion (Only when shoulder elevation > 60°) | [65°, 150°] | [45°, 65°] | [20°, 45°] | [-5°, 20°] |
| Wrist | Flexion (+) / Extension (-) | (-20°, 20°) | (-45°, -20°] ∪ [20°, 45°) | (-60°, -45°] ∪ [45°, 60°) | (-90°, -60°] ∪ [60°, 90°) |
| | Flexion (+) / Extension (-) | [0°, 30°] | [30°, 60°] | (-20°, -10°] ∪ [60°, 90°] | (-40°, -20°] ∪ [90°, 120°] |
| Back | Lateral Bend | [0°, 15°] | (-30°, -15°] ∪ [15°, 30°] | (-45°, -30°] ∪ [30°, 45°] | (-60°, -45°] ∪ [45°, 60°] |
| | Rotation | [0°, 30°] | (-45°, -30°] ∪ [30°, 45°] | (-90°, -45°] ∪ [45°, 90°] | (-110°, -90°] ∪ [90°, 110°] |
| Knee | Flexion | [0°, 45°] | [45°, 60°] | [60°, 90°] | [90°, 150°] |

FIG. 9

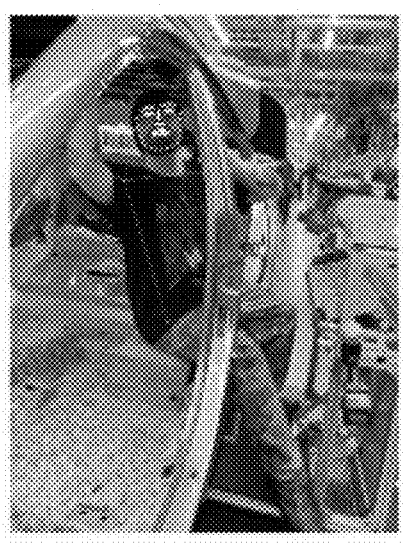
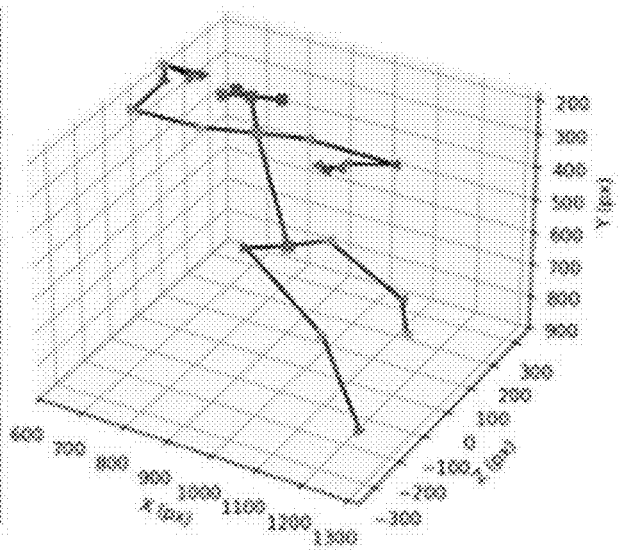
FIG. 10(A)
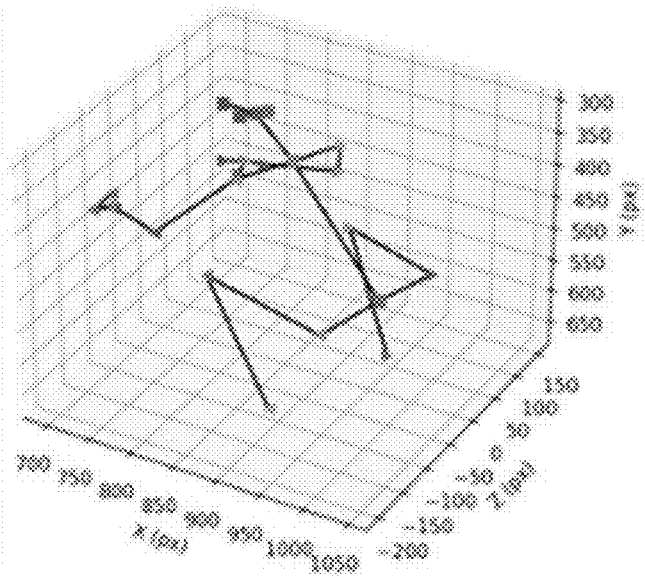
FIG. 10(B)

 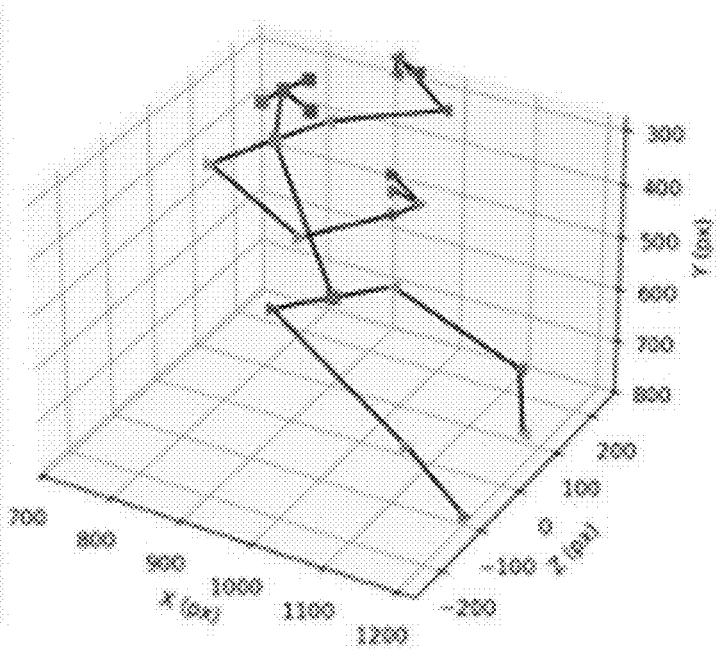
FIG. 11(A)
 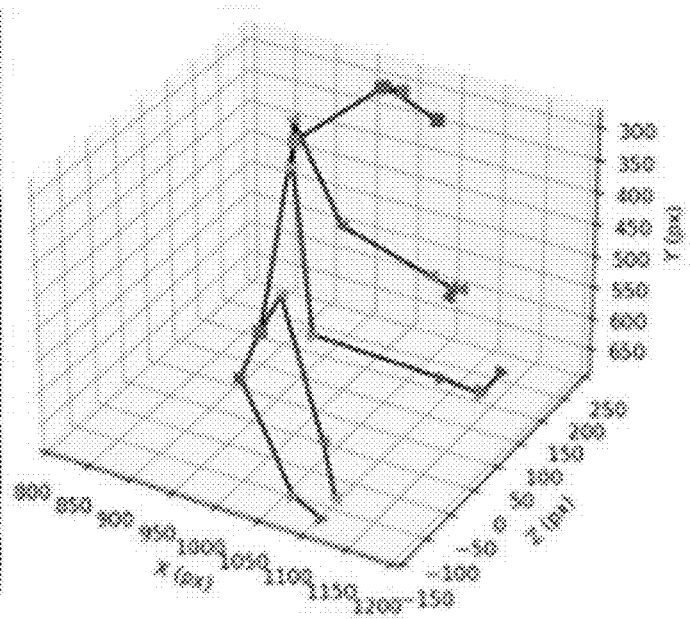
FIG. 11(B)

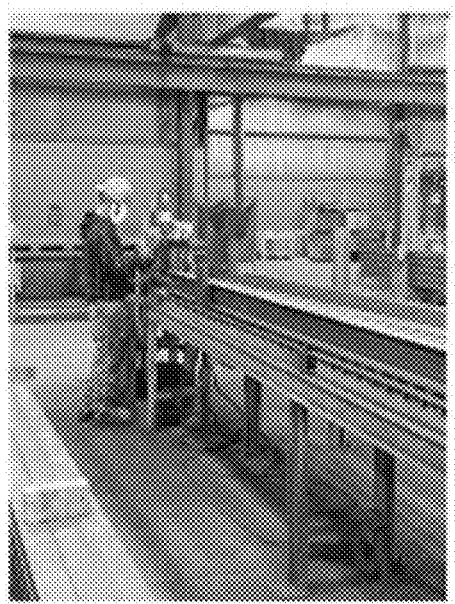
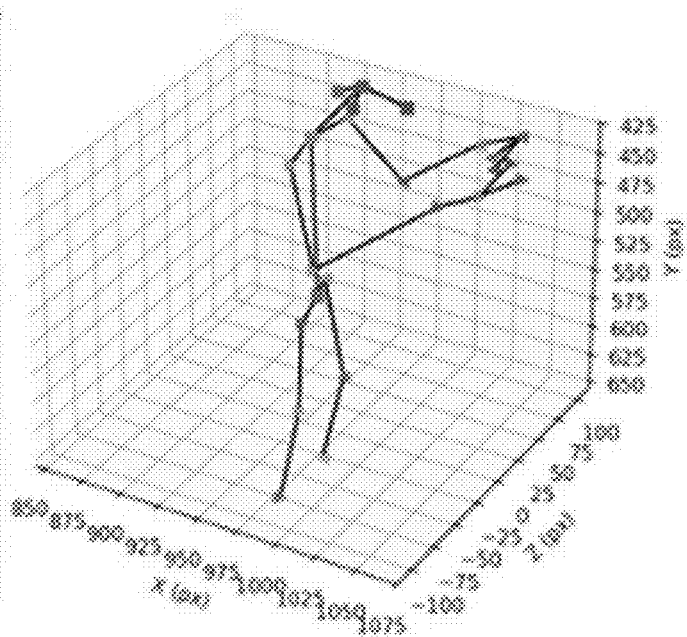
FIG. 12(A)
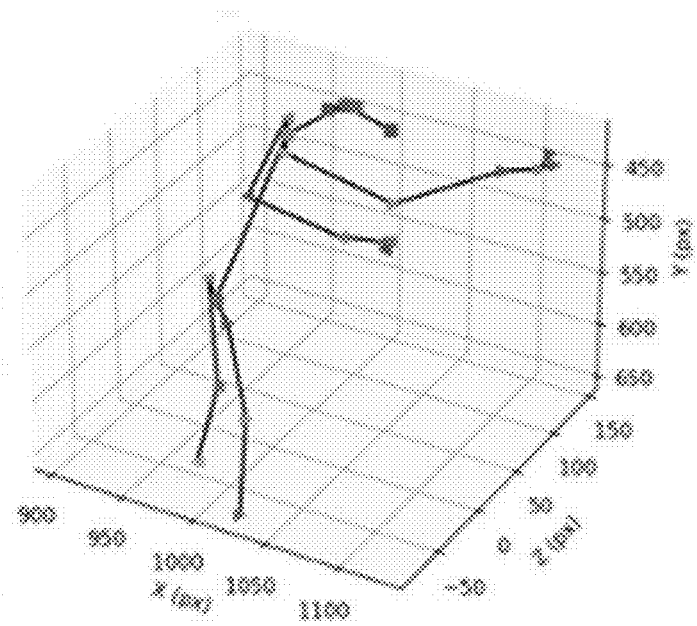
FIG. 12(B)

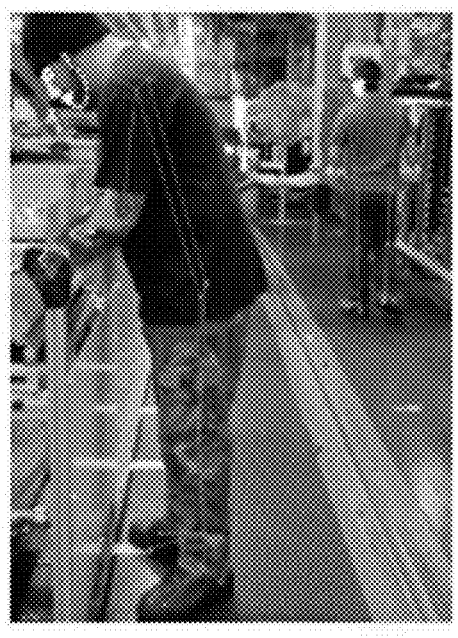
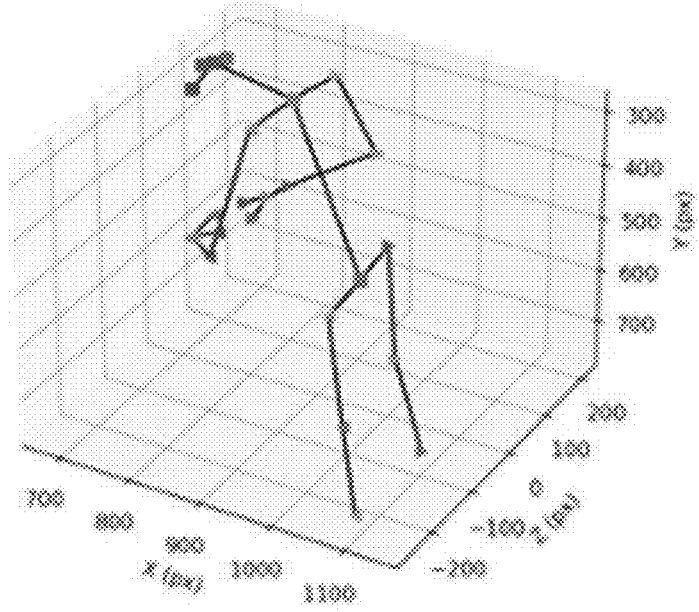
FIG. 13(A)
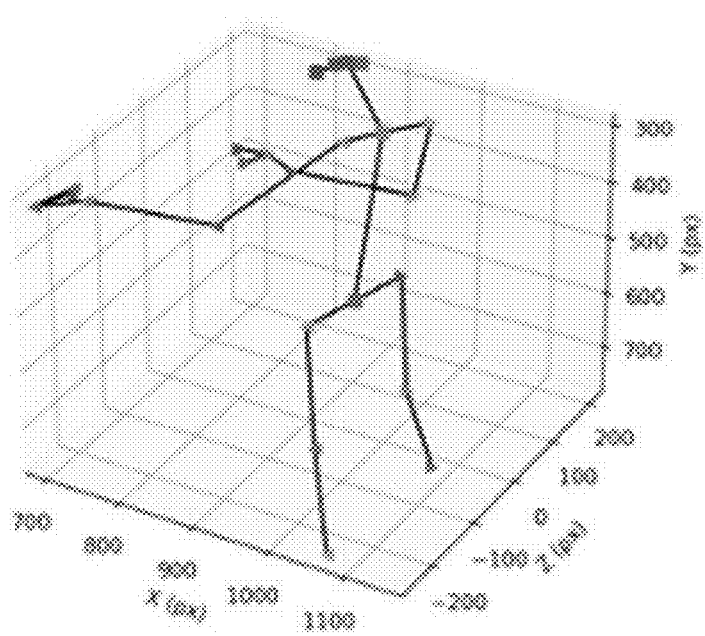
FIG. 13(B)

VISION-BASED THREE-DIMENSIONAL HUMAN POSE ESTIMATION SYSTEM AND METHOD FOR ERGONOMIC RISK ASSESSMENT

FIELD OF TECHNOLOGY

The present disclosure generally relates to a computing system and method for identifying and assessing ergonomic risks at workplaces, and more particularly relates to a computing system and method configured to obtain and generate three-dimensional (3D) motion capture datasets for ergonomic risk assessment.

BACKGROUND

Work-related musculoskeletal disorders (MSDs) are the leading cause of non-fatal injuries. MSDs cause pain and discomfort for the affected workers while also imposing financial burdens on employers through reduced worker productivity, increased absenteeism, higher workers' compensation claims, and elevated healthcare costs. MSDs are especially prevalent in labor-intensive industries such as manufacturing, where workers are frequently subjected to MSD risk factors such as forceful exertions and awkward postures.

A common practice to reduce MSD risks at worksites is to hire trained ergonomists to perform manual inspections. During such inspections, the ergonomists would observe workers perform their typical tasks and identify potential ergonomic problems with the help of ergonomic risk assessment guidelines such as Rapid Entire Body Assessment (REBA), Rapid Upper Limb Assessment (RULA), and Ovako Working Posture Assessment System (OWAS). However, such manual observation-based methods are time-consuming and reliant on the limited availability of ergonomists. Moreover, individuals' observation bias may also lead to inconsistencies in the risk assessment results.

Recent advancements in computer vision have shown potential in creating a sensorless automated ergonomic risk assessment solution using video analysis. Such methods eliminate the need for attaching physical sensors to the human body and only require a video recording of the work performed, making them less intrusive for workers and minimally disruptive to their work. They also have the potential to help ergonomists streamline their risk assessment workflow by automating the time-consuming task of observation-based angle estimations using readily available equipment such as a smartphone camera. This helps reduce manual errors and subjective bias from risk evaluations, allowing ergonomists to focus on more creative and complex tasks, such as developing targeted intervention strategies, ultimately improving the effectiveness of ergonomic risk assessment.

One commonly adopted method to perform vision-based ergonomic risk assessment is to extract two-dimensional (2D) human poses and 2D joint angle information from videos. These studies typically use deep learning models to detect 2D human poses and then calculate 2D joint angles for ergonomic risk assessment. However, 2D joint angles are prone to perspective errors caused by the camera's viewpoint, making them an inaccurate representation of the true 3D angles required by ergonomists. For instance, a 90-degree elbow bend may appear anywhere between 0 and 180 degrees, depending on the camera's orientation relative to the elbow. Consequently, 2D video analysis methods may be only reliable when additional constraints, such as the camera's orientation, are applied. However, in real-world settings, enforcing this orientation constraint may be impractical due to site limitations or be disruptive to work (e.g., asking workers to reenact pose for the camera).

Accordingly, there is a need for an advanced vision-based computing system and method for ergonomic risk assessment.

SUMMARY

Among other features, the present disclosure relates to a vision-based 3D pose estimation system for ergonomic risk assessment. An example system may comprise a computing device, comprising: a non-transitory computer readable storage medium storing instructions; and a processor coupled to the non-transitory computer readable storage medium and configured to execute the instructions to: obtain a monocular video capturing motions of a subject performing at least one working activity for a selected duration of time, perform a whole-body 2D pose estimation based at least on extracted frames of the monocular video, perform a whole-body 3D pose estimation based at least on the whole-body 2D pose estimation, calculate joint angles based at least on the whole-body 3D pose estimation, determine a posture score for each identified joint in each frame of the monocular video, and determine an ergonomic risk level of each identified joint based at least upon the posture score.

In some embodiments, the processor of the computing device may be configured to execute the instructions to perform the whole-body 2D pose estimation based at least on extracted frames of the monocular video by identifying a primary target in each segment of the monocular video and tracking the primary target throughout subsequent frames of the monocular video.

In another embodiment, the processor of the computing device may be further configured to execute the instructions to: identify a bounding box of each subject instance within each frame of the monocular video; in response to identify the bounding box, crop each frame of the monocular video in connection with the bounding box to isolate each subject instance into an individual image segment; and extract 2D pixel locations of each keypoint from each cropped subject instance in accordance with a selected whole-body pose estimation deep learning model.

In yet another embodiment, the processor of the computing device may be further configured to execute the instructions to: subsequent to extracting the 2D pixel locations of each keypoint, merge the 2D pixel locations and each keypoint back together into each frame of the monocular video; and track a same target instance across frames of the monocular video based at least upon merged 2D pixel locations and each keypoint.

In further embodiments, the processor of the computing device may be configured to execute the instructions to: in response to detecting multiple poses in a first frame of the monocular video, calculate an average confidence score across detected joints of the subject; rank each detected pose of the multiple poses based on the average confidence score; and select a highest average confidence score of one of the multiple poses as a primary tracking target for each video segment.

Moreover, the processor of the computing device may be configured to execute the instructions to: in response to detecting a single pose in a first frame of the monocular video, set a primary tracking target for each video segment based on the single pose; and track the primary tracking target using a body center of the single pose in subsequent frames of the monocular video.

According to additional embodiments, the processor of the computing device may be configured to execute the instructions to: calculate a 2D Euclidean distance between the body center and a center of the primary tracking target from a selected plurality of frames; identify one subject with a lowest average distance over the selected plurality of frames; and assign the one subject as the primary tracking target for a frame subsequent to the selected plurality of frames.

In an embodiment, the processor of the computing device may be configured to execute the instructions to perform the whole-body 3D pose estimation based at least on the whole-body 2D pose estimation by: using a deep learning model to determine spatial relationships between pose keypoints and temporal relationships between consecutive frames of the monocular video, wherein the deep learning model is trained on a material-handling task motions dataset. In addition, the processor of the computing device may be further configured to execute the instructions to: determine a plurality of keypoints for 3D joint angle calculations, wherein the plurality of keypoints include a first portion of keypoints relating to neck, back, shoulder, elbow, and knee joint angles, a second portion of keypoints relating to wrist angles, and a third portion of keypoints relating to head center, shoulder center, hip center, left hand, and right hand angles. The joint angles based at least on the whole-body 3D pose estimation may include angles of neck flexion, neck lateral bend, neck rotation, shoulder horizontal abduction, wrist flexion, and wrist deviation angles.

In accordance with another aspect, the present disclosure relates to a computer-implemented method, comprising: obtaining, by a processor of a computing device, a monocular video capturing motions of a subject performing at least one working activity for a selected duration of time; performing, by the processor of the computing device, a whole-body 2D pose estimation based at least on extracted frames of the monocular video; performing, by the processor of the computing device, a whole-body 3D pose estimation based at least on the whole-body 2D pose estimation; calculating, by the processor of the computing device, joint angles based at least on the whole-body 3D pose estimation; determining, by the processor of the computing device, a posture score for each identified joint in each frame of the monocular video; and determining, by the processor of the computing device, an ergonomic risk level of each identified joint based at least upon the posture score.

In one embodiment, the performing the whole-body 2D pose estimation based at least on extracted frames of the monocular video may comprise identifying a primary target in each segment of the monocular video and tracking the primary target throughout subsequent frames of the monocular video.

According to certain embodiments, the computer-implemented method may further comprise identifying, by the processor of the computing device, a bounding box of each subject instance within each frame of the monocular video; in response to identify the bounding box, cropping, by the processor of the computing device, each frame of the monocular video in connection with the bounding box to isolate each subject instance into an individual image segment; and extracting, by the processor of the computing device, 2D pixel locations of each keypoint from each cropped subject instance in accordance with a selected whole-body pose estimation deep learning model.

In an embodiment, the computer-implemented method may further comprise subsequent to extracting the 2D pixel locations of each keypoint, merging the 2D pixel locations and each keypoint back together into each frame of the monocular video; and tracking a same target instance across frames of the monocular video based at least upon merged 2D pixel locations and each keypoint.

In yet another embodiment, the computer-implemented method may further comprise: in response to detecting multiple poses in a first frame of the monocular video, calculating an average confidence score across detected joints of the subject; ranking each detected pose of the multiple poses based on the average confidence score; and selecting a highest average confidence score of one of the multiple poses as a primary tracking target for each video segment.

In an additional embodiment, the computer-implemented method may further comprise: in response to detecting a single pose in a first frame of the monocular video, setting a primary tracking target for each video segment based on the single pose; and tracking the primary tracking target using a body center of the single pose in subsequent frames of the monocular video.

In a further embodiment, the computer-implemented method may further comprise: calculating a 2D Euclidean distance between the body center and a center of the primary tracking target from a selected plurality of frames; identifying one subject with a lowest average distance over the selected plurality of frames; and assigning the one subject as the primary tracking target for a frame subsequent to the selected plurality of frames.

In one embodiment, the performing the whole-body 3D pose estimation based at least on the whole-body 2D pose estimation may comprise using a deep learning model to determine spatial relationships between pose keypoints and temporal relationships between consecutive frames of the monocular video, wherein the deep learning model is trained on a material-handling task motions dataset.

According to various embodiments, the computer-implemented method may further comprise: determining a plurality of keypoints for 3D joint angle calculations, wherein the plurality of keypoints include a first portion of keypoints relating to neck, back, shoulder, elbow, and knee joint angles, a second portion of keypoints relating to wrist angles, and a third portion of keypoints relating to head center, shoulder center, hip center, left hand, and right hand angles. The joint angles based at least on the whole-body 3D pose estimation may include angles of neck flexion, neck lateral bend, neck rotation, shoulder horizontal abduction, wrist flexion, and wrist deviation angles.

The above simplified summary of example aspects serves to provide an understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 7 illustrates a comparison of joint angles calculated from different body keypoint formats, according to an exemplary aspect of the present disclosure;

FIG. 9 illustrates a number of joint angles and posture scores for assessing ergonomic risk, according to an exemplary aspect of the present disclosure;

FIG. 10(A) illustrates 2D and 3D human pose estimate outputs based on a first example video frame showing uncommon postures, according to an exemplary aspect of the present disclosure;

FIG. 10(B) illustrates 2D and 3D human pose estimate outputs based on a second example video frame showing uncommon postures, according to an exemplary aspect of the present disclosure;

FIG. 11(A) illustrates 2D and 3D human pose estimate outputs based on a first example video frame showing heavy occlusions, according to an exemplary aspect of the present disclosure;

FIG. 11(B) illustrates 2D and 3D human pose estimate outputs based on a second example video frame showing heavy occlusions, according to an exemplary aspect of the present disclosure;

FIG. 12(A) illustrates 2D and 3D human pose estimate outputs based on a first example video frame showing far away targets, according to an exemplary aspect of the present disclosure;

FIG. 12(B) illustrates 2D and 3D human pose estimate outputs based on a second example video frame showing far away targets, according to an exemplary aspect of the present disclosure;

FIG. 13(A) illustrates 2D and 3D human pose estimate outputs based on a first example video frame relating to multi-person scenarios, according to an exemplary aspect of the present disclosure; and FIG. 13(B) illustrates 2D and 3D human pose estimate outputs based on a second example video frame relating to multi-person scenarios, according to an exemplary aspect of the present disclosure.

DETAILED DESCRIPTION

Figure 1:
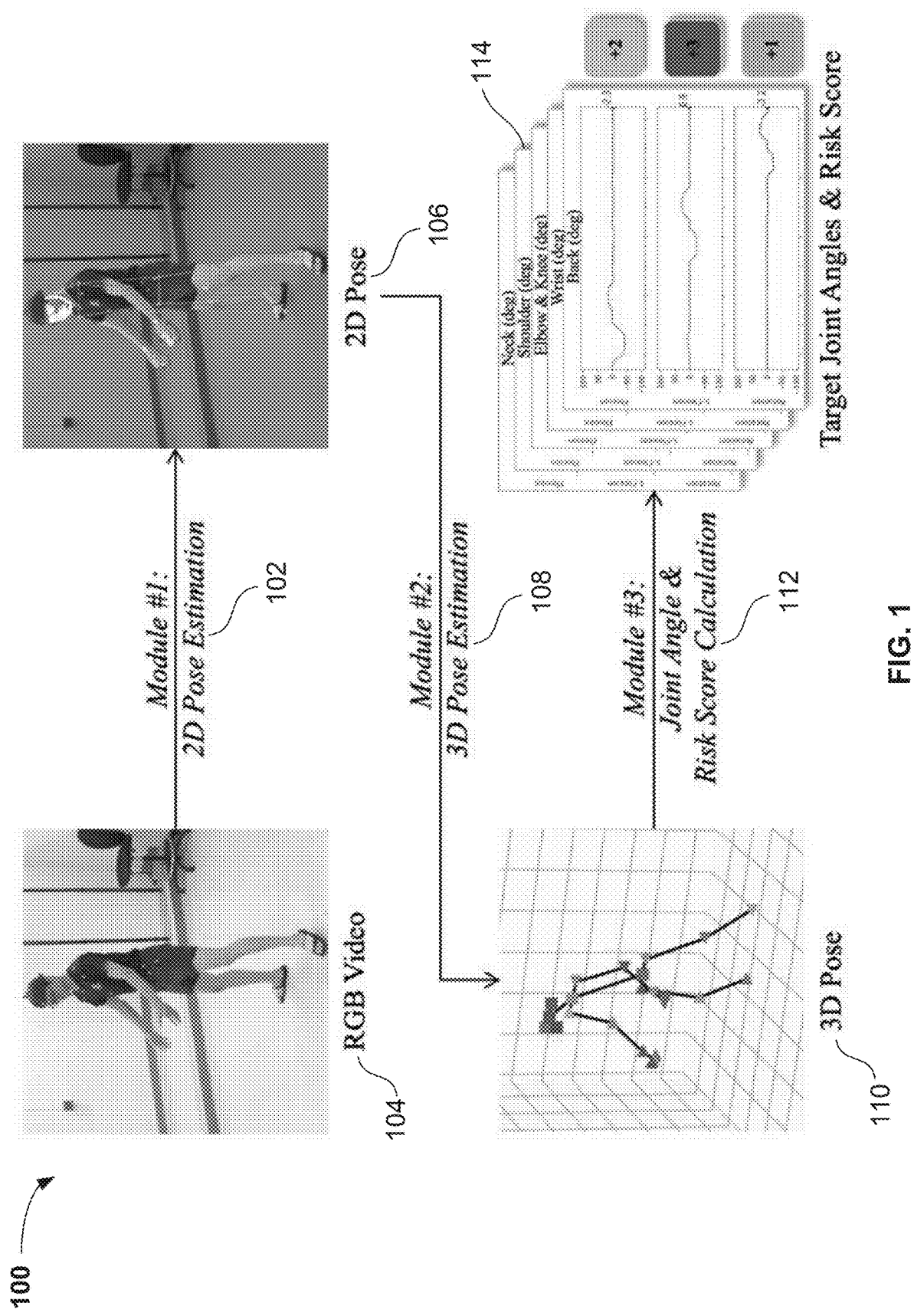
FIG. 1 illustrates a vision-based ergonomic risk assessment pipeline, according to an exemplary aspect of the present disclosure.

Various aspects of the present disclosure will be described with reference to the drawings, wherein like reference numerals are used to refer to like elements throughout. In the following description, for purposes of explanation, numerous specific details are set forth in order to promote a thorough understanding of one or more aspects of the present disclosure. It may be evident in some or all instances, however, that any aspects described below can be practiced without adopting the specific design details described below.

Recent developments in vision-based human pose estimation have made it possible to develop automatic ergonomic risk assessment tools that allow continuous awkward posture detection using an ordinary video camera. For example, machine learning (ML) models may be utilized to estimate workers' 2D and/or 3D joint locations from video and image frames. These joint locations may be used to calculate joint angles and perform an ergonomic risk analysis. However, currently available datasets may not be suitable or sufficient for ergonomic analysis in an industrial setting. For example, simplified skeleton representations of human activities used in the available datasets lack essential keypoint information needed for calculating intricate ergonomic angles such as wrist rotations. Keypoints generally refer to specific anatomical landmarks on a human body (e.g., joints, spine, or extremities) that are analyzed to evaluate posture, motion, or musculoskeletal stress. ML models trained on traditional datasets face limitations in conducting comprehensive ergonomic analyses, as they lack complete access to joint angles. Moreover, the generic motions portrayed in such datasets may deviate significantly from the customary manual tasks executed within industrial settings, thereby compromising the 3D pose estimation performance of a trained ML model when deployed in such environments.

As will be described fully below, 3D motion capture methods may estimate 3D human poses from 2D poses and use them to calculate 3D joint angles for ergonomic risk assessment. Such calculated 3D angles are configured to eliminate perspective errors caused by camera viewpoints, providing more accurate joint angle measurements. Additionally, 3D motion capture allows for more intricate angle analysis for joints with multiple degrees of freedom. For example, instead of measuring a single angle for back bending, it can now be broken down into back flexion, lateral bending, and rotation angles. However, existing studies found it challenging to extract accurate 3D angle calculations, especially under challenging real-world industry settings where occlusion and unusual postures are common. Moreover, many 3D human pose estimation models, trained on popular 3D datasets, use a simplified joint center representation of the human body without capturing the 3D positions for extremities such as the hands. This simplification makes existing models inadequate for estimating joint angles near the extremities, such as the wrist angle.

To at least address these limitations, as shown in FIG. 1, the present disclosure includes a vision-based ergonomic risk assessment workflow or pipeline 100. In one aspect, a modular configuration may be employed for the disclosed vision-based ergonomic risk assessment framework, facilitating the seamless integration of 2D and 3D pose estimation models with leading performance in their respective tasks while also ensuring flexibility for future updates as more advanced models become available. In another aspect, a 3D model of the present disclosure may be trained on a large-scale motion capture (MoCap) dataset, VEHS-7M, which features keypoints designed for joint angle calculations and typical material-handling task motions. Compared with the simplified pose representation commonly used by popular 3D datasets, the dataset of the present disclosure may also include additional keypoints on body extremities, such as hands, ears, and nose, enabling more detailed angle calculations for neck and wrist angles. Unlike models trained using generic human motions, such as walking, sitting, or talking on the phone, the 3D pose estimation model of the present disclosure may be specifically trained on material-handling tasks, such as lifting, carrying, and assembling, making it more effective for typical industrial tasks. In an additional aspect, the present disclosure relates a computing system and method configured to transform the available 3D keypoints from monocular motion capture into the body joint angles required for ergonomic risk assessment. As shown in FIG. 1, an example pipeline of the workflow 100 may include multiple modules. In one embodiment, Module #1 102 may leverage selected 2D pose estimation methods to extract a whole-body 2D human pose 106 from red green and blue (RGB) video frames 104 and employs at least one custom tracking algorithm to reliably identify and track the primary human pose target throughout the video frames. Module #2 108 may be configured to use a 2D-to-3D pose estimation model trained on an industrial MoCap dataset, VEHS-7M, to estimate a 24-keypoint 3D human pose 110 from the 2D pose 106. Module #3 112 may be configured to calculate the necessary joint angles from the 3D human pose 110 and estimate ergonomic risk using a customized risk table 114.

As will be described fully below, the end-to-end 3D video analysis pipeline of the present disclosure estimates posture scores from monocular camera videos. The disclosed computing system and method improves upon existing 2D video analysis solutions that automate the traditionally time-consuming observation-based ergonomic risk assessment task by estimating the joint angles in 3D. Compared to 2D video analysis solutions, the 3D pipeline of the present disclosure does not require strict camera orientation constraints (e.g., maintaining subject side or front views) to capture accurate joint angles. The 3D angles determined by the computing system and method of the present disclosure effectively eliminate the 2D perspective errors caused by the camera's orientation relative to the subject, allowing for more accurate and view-invariant 3D angle measurements. This allows ergonomists to record workers in their natural working environments without adjustments for optimal camera angles, reducing worker disruption and streamlining the ergonomist's task.

In some aspects, the 3D pipeline of the present disclosure introduces several features that enhance its utility as a vision-based ergonomic risk assessment tool and prepare it for actual industry applications. First, it estimates a 24-keypoint human pose, with additional keypoints on the ears and hands, compared to the conventional 17-keypoint pose. Specifically, the four extra hand keypoints at the metacarpophalangeal joints of the index and little fingers provide sufficient data to capture 3D hand movements in the coronal and sagittal planes. The added ear keypoints fully define the head as a rigid body segment, allowing for the calculation of neck angles in the whole 3 degrees of freedom. These additional angles are essential for various ergonomic risk assessments, including REBA, RULA, and other advanced MSD risk angle assessment. Second, the pipeline of the present disclosure adopts a modular design, allowing seamless integration with state-of-the-art 2D and 3D human pose estimation models. This design leverages the best-performing models for accurate 3D pose estimation while providing the flexibility to incorporate future advancements as new models become available. Third, the present disclosure relates to a custom tracking algorithm that detects and consistently tracks the primary human target throughout a video. This enables the pipeline of the present disclosure to handle challenging real-life scenarios with multiple people in the frame, including individuals moving in and out of the background. In addition, by training at least one 3D pose model on a dataset focused on material-handling tasks, the pipeline of the present disclosure is specifically optimized for industrial applications, where these material-handling tasks are common.

Figure 2:
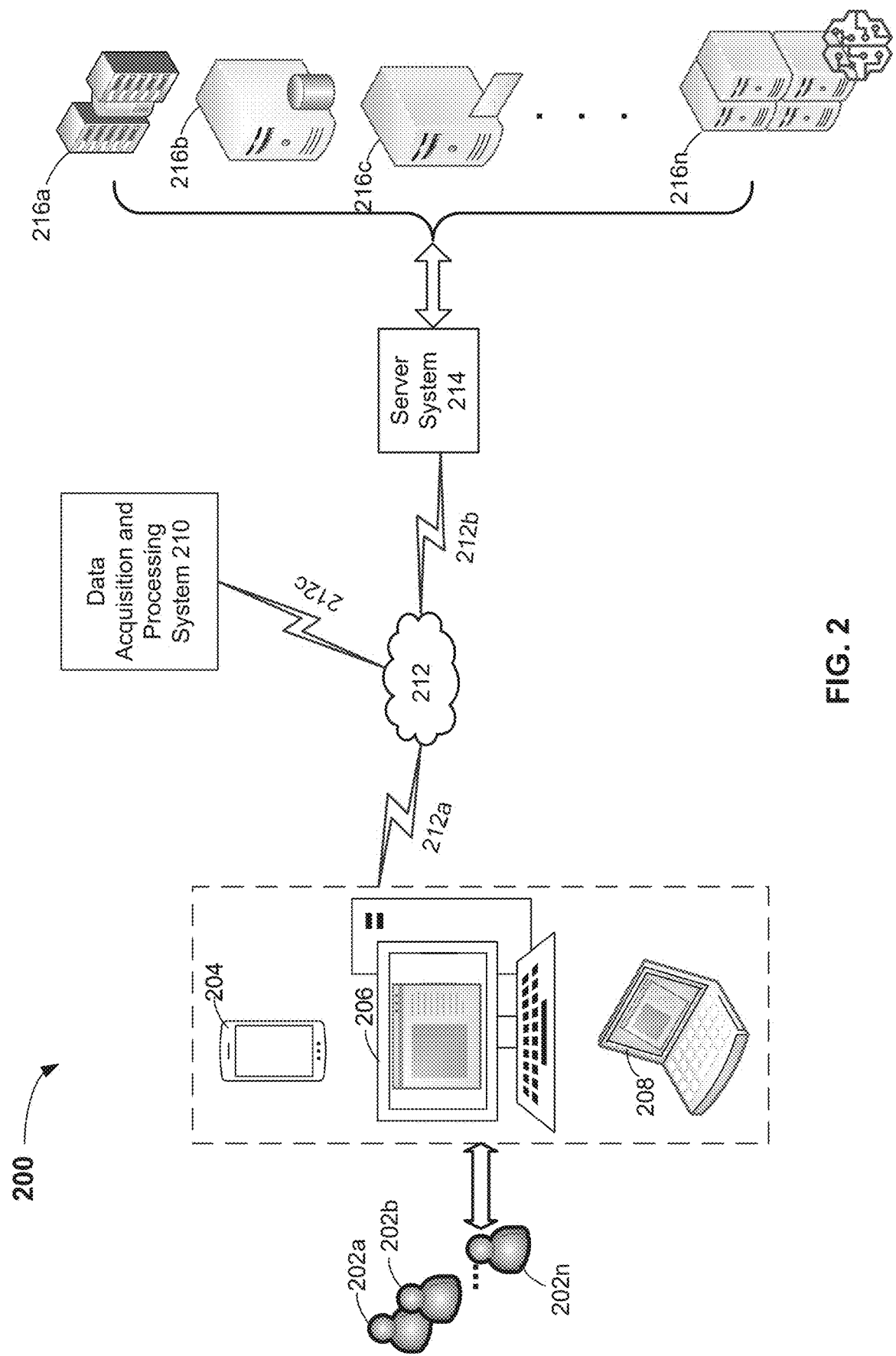
FIG. 2 illustrates a diagram of a vision-based ergonomic risk assessment computing system, according to an exemplary aspect of the present disclosure.

Referring to FIG. 2, a computing system 200 deployed within a server-based computing environment and communication network may be configured to implement the vision-based ergonomic risk assessment pipeline 100 of FIG. 1, in accordance with aspects of the present disclosure. A user 202a, 202b, ... 202n may use a selected computing device or system 204, 206, 208 to obtain industrial videos or signals relating to human poses which may be transmitted to a server system 214, using suitable communication protocol(s) 212a, 212b, and 212c, and at least one communication network 212.

The communication network 212 may generally include a geographically distributed collection of computing devices or data points interconnected by communication links and segments for transporting signals and data therebetween. The communication protocol(s) 212a, 212b, and 212c may generally include a set of rules defining how computing devices and networks may interact with each other, such as frame relay, Internet protocol (IP), transmission control protocol (TCP), user datagram protocol (UDP), hypertext transfer protocol (HTTP). It should be appreciated that the system 200 of the present disclosure may use any suitable communication network, ranging from local area networks (LANs), wide area networks (WANs), cellular networks, to overlay networks and software-defined networks (SDNs), a packet data network (e.g., the Internet), mobile telephone networks (e.g., cellular networks, such as 4G or 5G), Plain Old Telephone (POTS) networks, and wireless data networks (e.g., Institute of Electrical and Electronics Engineers (IEEE) 802.11 family of standards known as Wi-Fi®, WiGig®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, virtual private networks (VPN), Bluetooth, Near Field Communication (NFC), or any other suitable network.

The server system 214 may be configured to train, host, incorporate or make an application programming interface (API) call to at least one of a plurality of computing systems 216*a*, 216*b*, 216*c*, . . . 216*n* to process the input and generate responses. In a preferred embodiment, the plurality of computing systems 216*a*, 216*b*, 216*c*, . . . 216*n* may include one or more large language models (LLMs) and/or ML models that have been trained for processing received prompts and data to identify the root causes of the incident record and determining corrective action(s) for each identified root cause.

In some embodiments, the server system 214 may be Cloud-based or an on-site server. The term "server" generally refers to a computing device or system, including processing hardware and process space(s), an associated computer readable storage medium such as a memory device or database, and, in some instances, at least one database application as is well known in the art. The server system 214 may provide functionalities for any connected devices such as sharing data or provisioning resources among multiple client devices, or performing computations for each connected client device. According to one embodiment, within a Cloud-based computing architecture, the server system 214 may provide various Cloud computing services using shared resources. Cloud computing may generally include Internet-based computing in which computing resources are dynamically provisioned and allocated to each connected computing device or other devices on-demand, from a collection of resources available via the network or the Cloud. Cloud computing resources may include any type of resource, such as computing, storage, and networking. For instance, resources may include service devices (firewalls, deep packet inspectors, traffic monitors, load balancers, etc.), computing/processing devices (servers, central processing units (CPUs), graphics processing units (GPUs), random access memory, caches, etc.), and storage devices (e.g., network attached storages, storage area network devices, hard disk drives, solid-state devices, etc.). In addition, such resources may be used to support virtual networks, virtual machines, databases, applications, etc. The term "storage device" or "database," as used herein, may refer to a database (e.g., relational database management system (RDBMS) or structured query language (SQL) database), or may refer to any other data structure, such as, for example a comma separated values (CSV), tab-separated values (TSV), JavaScript Object Notation (JSON), extendible markup language (XML), TeXT (TXT) file, flat file, spreadsheet file, and/or any other widely used or proprietary format. In some embodiments, one or more of the databases or data sources may be implemented using one of relational databases, flat file databases, entity-relationship databases, object-oriented databases, hierarchical databases, network databases, NoSQL databases, and/or record-based databases.

Cloud computing resources accessible using any suitable communication network (e.g., Internet) may include a private Cloud, a public Cloud, and/or a hybrid Cloud. Here, a private Cloud may be a Cloud infrastructure operated by an enterprise for use by the enterprise, while a public Cloud may refer to a Cloud infrastructure that provides services and resources over a network for public use. In a hybrid Cloud computing environment, which uses a mix of on-premises, private Cloud and third-party, public Cloud services with orchestration between the two platforms, data and applications may move between private and public Clouds for greater flexibility and more deployment options. Some example public Cloud service providers may include Amazon (e.g., Amazon Web Services® (AWS)), IBM (e.g., IBM Cloud), Google (e.g., Google Cloud Platform), and Microsoft (e.g., Microsoft Azure®). These providers provide Cloud services using computing and storage infrastructures at their respective data centers and access thereto is generally available via the Internet. Some Cloud service providers (e.g., Amazon AWS Direct Connect and Microsoft Azure ExpressRoute) may offer direct connect services and such connections typically require users to purchase or lease a private connection to a peering point offered by these Cloud providers.

In one embodiment, an application, which may include a mobile or web-based application (e.g., native iOS or Android Apps), may be downloaded and installed on the selected computing device or system 204, 206, or 208 for interacting with each user 202*a*, 202*b* . . . 202*n* which includes but not limited to employers, ergonomic risk experts, injury prevention specialists, system/network administrators, software developers, and end-users. Automated agents, scripts, playback software, and the like acting on behalf of one or more people may also be user 202*a*, 202*b* . . . 202*n*. Such a user-facing application of the computing system 200 may include a plurality of modules and libraries executed and controlled by the microcontroller or processor of the hosting computing device or system 204, 206, 208 for performing functions locally on each computing device or making remote calls (e.g., API calls) to the server system 214 to access specific functionalities. The division of labor between local execution and server-side operations depends on how each module or library is designed and what its functions require.

In one embodiment, one or more libraries downloaded on the selected computing device or system 204, 206, 208 may be configured to perform all their operations locally without relying on the server system 214. That is, once a library is installed, it may access the resources and computing power available on each computing device 204, 206, 208 to execute tasks. For example, certain libraries may be configured to perform computations locally using each computing device's CPU/GPU. Further, file handling libraries may be configured to process files stored on the local device. If pre-trained ML models are included in the library, they may run locally, depending on each device's capabilities. Local execution of these libraries may not require e.g., Internet connection. Since there is no network latency, execution is faster for these local operations. Further, there is a greater control over data privacy, since no data needs to be sent to an external server. However, limited by each device's hardware (e.g., memory, processing power), local execution may involve downloading potentially large libraries, models, or datasets.

According to another embodiment, remote execution (server-side processing) may be implemented, and libraries downloaded on each computing device 204, 206, 208 may make remote calls (e.g., API calls) to the server system 214 to access certain functionalities, for example, when the functions a library provides are too resource-intensive for local execution or require access to constantly updated data (e.g., real-time services, large-scale models, or databases). In this case, the library acts as a client-side interface that makes API requests to the server system 214 to perform specific tasks.

In one example, a library may interface with services like OpenAI's GPT, Google Cloud AI, or Amazon S3, where the computation may be carried out on the server system 214, and the selected computing device 204, 206, 208 sends requests and receives results. In another example, libraries like AWS SDK, Google Cloud SDK may allow interaction with Cloud storage to upload, retrieve, and manipulate data on the Cloud.

Server-side processing may offload heavy computation to powerful servers (e.g., at least one of a plurality of computing systems 216a, 216b, 216c, ... 216n), provide access to real-time data and updated services, and being device-agnostic by working even on devices with limited resources (smartphones, tablets, etc.).

According to additional embodiments, libraries implemented on each selected computing device 204, 206, 208 may adopt a hybrid model, where some operations or computations may be performed locally, while more complex or resource-intensive tasks are offloaded to the server system 214. For example, basic computations, preprocessing, or user interface elements may be handled locally, while complex processing, data retrieval, or heavy computations (e.g., running large AI models or interacting with databases) are carried out via the server system 214.

According to further embodiments, as shown in FIG. 2, a data acquisition and processing system 210, which may be controlled by at least one of the computing devices 204, 206, 208 or may operate as a stand-alone system, may include various data capture devices to obtain video data for ergonomic risk assessment purposes. For example, at least one camera and/or other video capture devices may be positioned at a selected location to obtain RGB videos in real industrial settings. One example camera may include a monocular camera with a single lens and single image sensor. It captures images from a single point of view in 2D form. It captures 2D images with depth cues inferred through visual perspective rather than actual distance measurements. A monocular camera can often be an RGB camera, as a standard camera with a single lens captures RGB images. An RGB camera refers to a camera that captures color information using the red, green, and blue color model. This is a standard digital color imaging format. An RGB camera may be monocular (single-lens) or part of multi-view camera systems.

In one embodiment, the data acquisition and processing system 210 may be a thin client device/terminal/application deployed within the computing system 200 and may have computation capabilities for preliminary processing of received video/image data. In one embodiment, the data acquisition and processing system 210 may transmit the obtained data to at least one of the computing devices 204, 206, 208 or the server system 214 for performing data post processing functions.

The data acquisition and processing system 210 may communicate and sync collected data, the detected location of each video capture device, and other parameters (e.g., calibration data of each video capture device) through wireless signals. Further, the data acquisition and processing system 210 may be configured to upload data to other devices (e.g., at least one of the computing devices 204, 206, 208 or the server system 214), and/or a cloud storage location via the communication network 212. According to one embodiment, the data acquisition and processing system 210 may utilize any suitable communication protocol such that all connected video capture devices are configured to geospatially aware of one another, and at least one of the computing devices 204, 206, 208 or the server system 214 may monitor and track the location of each of the plurality of video capture devices in real-time, thereby enabling data processing that is simpler, faster, and requires less user input. Additionally, each video capture device may transfer captured data during its recording session to free up storage space on itself and the local storage of the data acquisition and processing system 210, thereby enabling continuous recording.

Figure 3:
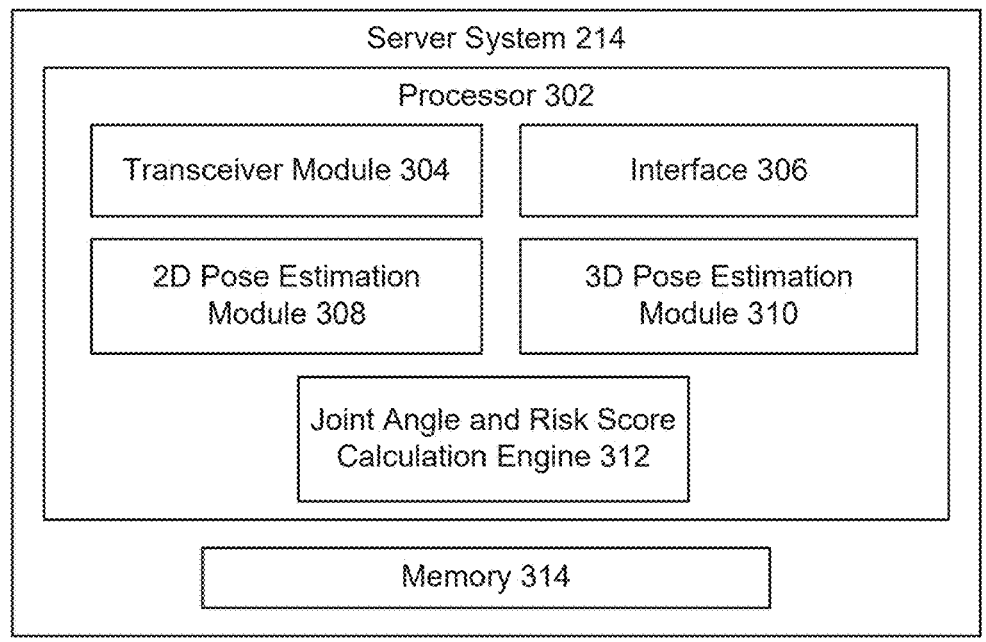
FIG. 3 illustrates a block diagram of a server computing system for vision-based ergonomic risk assessment, according to an exemplary aspect of the present disclosure.

Referring now to FIG. 3, at least one processor 302 of the server system 214 may be configured to control and execute a plurality of modules and engines which may include a transceiver module 304, an interface 306, 2D pose estimation module 308, 3D pose estimation module 310, and a joint angle and risk score calculation engine 312. The term "module" and "engine" as used herein refers to a real-world device, component, or arrangement of components and circuitries implemented using hardware, such as by an application specific integrated circuit (ASIC) or field-programmable gate array (FPGA), for example, or as a combination of hardware and software, such as by a microprocessor system and a set of instructions to implement the module's or engine's functionality, which (while being executed) transform the microprocessor system into a special purpose device. A module or engine may also be implemented as a combination of the two, with certain functions facilitated by hardware alone, and other functions facilitated by a combination of hardware and software. Each module or engine may be realized in a variety of suitable configurations, and should not be limited to any example implementation exemplified herein.

Memory 314, which is coupled to processor 302, may be configured to store at least a portion of information obtained by the server system 214. In one aspect, memory 314 may be a non-transitory computer readable medium configured to store at least one set of data structures or instructions (e.g., software) embodying or utilized by at least one of the techniques or functions described herein. It should be appreciated that the term "non-transitory computer readable medium" may include a single medium or multiple media (e.g., one or more caches) configured to store at least one instruction. The term "computer readable medium" may include any medium that is capable of storing, encoding, or carrying instructions for execution by all modules or engines of the server system 214 and that cause these modules or engines to perform at least one of the techniques of the present disclosure, or that is capable of storing, encoding or carrying data structures used by or associated with such instructions. Non-limiting computer readable medium examples may include solid-state memories, and optical and magnetic media. Specific examples of computer readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks.

The transceiver module 304 of the server system 214 may be controlled by processor 302 to exchange various information and data with other computing devices deployed within the communication network 212 and connected with the server system 214 (e.g., at least one of the computing device or system 204, 206, or 208, the data acquisition and processing system 210, and/or the computing systems 216a, 216b, 216c, ... 216n of FIG. 2).

Interface 306 may be controlled by processor 302 to provide necessary communication and interaction functions between various software components, hardware components, or users. For example, interface 306 may provide a set of functions or protocols for other components to interact with a particular system or service, or be a physical device or circuitry that connects different electronic components or systems. For example, the user-facing application downloaded and installed on each hosting computing device or system 204, 206, or 208 of FIG. 2 may be a thin client device/terminal/application deployed within the system 200 and may be configured to perform certain preliminary processing of received data. Thereafter, the processed data may be transmitted to the server system 214 for further processing. In one embodiment, interface 306 may include an API interface configured to make one or more API calls therethrough. For example, the computing systems 216a, 216b, 216c, . . . 216n of FIG. 2 may include one or more LLMs, deep learning, ML models and the API interface 306 of the server system 214 may exchange data with each LLM or ML's API. On the other hand, the server system 214 may include an API gateway device (not shown) configured to receive and process API calls from various connected computing devices deployed within the system 200 (e.g., an operating system, a library, a device driver, an API, an application program, software or other module). Such an API gateway device may specify one or more functions, methods, classes, objects, protocols, data structures, formats and/or other features of the server system 214 that may be used by the mobile or web-based application. For example, the API interface included in the interface 306 may define at least one calling convention that specifies how a function associated with the server system 214 receives data and parameters from a requesting device/system and how the function returns a result to the requesting device/system. It should be appreciated that the server system 214 may include additional functions, methods, classes, data structures, and/or other features that are not specified through the API interface and are not available to a requesting computing device.

The server system 214 (e.g., Cloud-based or an on-site server) of the present disclosure may connect with various computing systems 216a, 216b, 216c, . . . 216n which may comprise 2D and/or 3D human pose estimation models and datasets. For another example, one of the computing systems 216a, 216b, 216c, . . . 216n may comprise an artificial intelligence based diagnostic system or an expert or knowledge based diagnostic or evaluation system for providing or optimizing recommendations that may include text, audio, video, and other rich media explanations.

Module #1: 2D Human Pose Estimation from Video Frames

Accurately tracking each human instance in multi-person videos and extracting 2D human poses is crucial for the vision-based ergonomic risk assessment pipeline of the present disclosure, as it serves as the foundation for all subsequent modules. In one aspect, the 2D pose estimation module 308 of the server system 214 may be configured to leverage the inference pipeline of selected pre-trained 2D pose estimation models for both 2D-3D pose training data generation and pipeline's inference of the computing system 200. Additionally, a custom tracking algorithm may be utilized to identify the primary human target in each video segment and track it throughout the subsequent video frames. This tracking algorithm of the present disclosure made it possible for the proposed vision-based pipeline to handle complicated real-life industrial scenarios, accommodating subject movement, camera motion, camera zoom, and background activity from other detected human instances.

In one embodiment, the 2D pose estimation module 308 may employ, host, incorporate, or operate a 2D human pose estimation deep learning (DL) or ML model (e.g., at least one of the computing systems 216a, 216b, 216c, . . . 216n) which may be configured to perform live video analysis and real-time inference. The architecture of such a DL/ML model may be resource-efficient, designed to run on devices with limited computational power, such as mobile or edge devices. In response to receiving an image (or video frame) containing one or more humans, advanced neural network architectures and techniques may be used to preprocess the input, often resized and normalized, for compatibility with the underlying DL/ML model. Convolutional neural network (CNN) layers may be used to extract features from the image. For example, early layers capture basic patterns like edges and textures, while deeper layers learn more complex representations, such as body shapes and joint relationships. The neural network may predict heatmaps for each keypoint (e.g., shoulder, elbow, wrist). A heatmap is a 2D matrix where the intensity of values corresponds to the likelihood of a keypoint being at a given position in the image. For instance, a high-intensity region on the heatmap for the "left elbow" may indicate the likely location of the left elbow in the image.

After generating heatmaps, the 2D pose estimation module 308 may control the neural network to apply algorithms (e.g., finding the maximum intensity) to identify the precise coordinates of each keypoint. In some embodiments, keypoints may be refined by considering contextual information, like the relative position of nearby keypoints. The final output may include a set of keypoint coordinates for each person in the image. For example, an individual may have a list of multiple keypoints (e.g., head, shoulders, elbows, etc.) identified, each represented by (x, y) coordinates.

The 2D pose estimation module 308 may also control the DL/ML model to compare its predicted heatmaps/keypoints with ground truth annotations of keypoints from a labeled dataset. It may minimize a loss function (e.g., mean squared error between predicted and actual heatmaps) using optimization algorithms (e.g., Stochastic gradient descent (SGD)). Over multiple iterations, the DL/ML model may learn to predict keypoints more accurately.

In certain implementations, the 2D pose estimation module 308 may incorporate multi-scale features by using pyramidal or hierarchical approaches to detect keypoints at different scales. Further, attention mechanisms may be employed to focus on relevant areas (e.g., regions containing humans) and improve accuracy. For video inputs, temporal information may be utilized to leverage sequential frames to ensure stability and smoothness of keypoint detection.

According to one example, RTMPose may be selected for its real-time multi-person pose estimation capability, state-of-the-art benchmark performance, and support for 133 COCO-WholeBody keypoints, which provide crucial 3D location information for the subsequent angle calculation steps.

Figure 4:
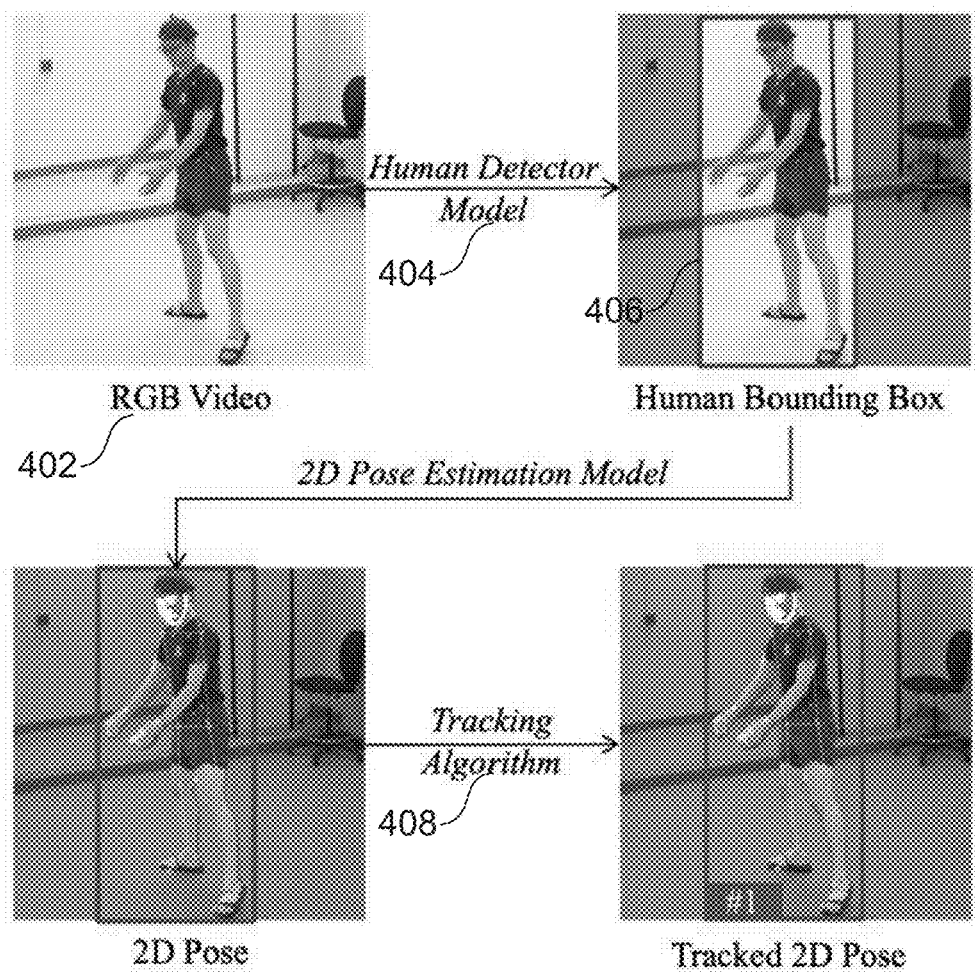
FIG. 4 illustrates human detection, pose estimation, and tracking steps during a 2D human pose estimation from video frames, according to an exemplary aspect of the present disclosure.

FIG. 4 illustrates human detection, pose estimation, and tracking steps in Module #1, in accordance with aspects of the present disclosure. In response to receiving a RGB video 402, the 2D pose estimation module 308 may employ a human detector model 404 (e.g., RTMDet) to identify a bounding box 406 location of each human instance within each video frame. After detecting the bounding boxes, each frame may be cropped to these regions, isolating individual human instances into small image segments. Next, the RTMPose inference pipeline may be used to extract the 2D pixel locations of each keypoint, following the COCO-WholeBody keypoint format. This format includes 133 human body keypoints: 17 body keypoints, 42 hand keypoints, 6 foot keypoints, and 68 face keypoints. In some embodiments, the COCO-WholeBody model may be preferred over the conventional 17 keypoints COCO-Pose model specifically for the additional hand keypoints, which are essential in capturing wrist joint angles.

After extracting the 2D keypoints from each cropped human instance, an additional step may be performed by the 2D pose estimation module 308 to merge them back together into the video frame and keep track of the same human instance across frames. This step is crucial to prevent the estimated 2D pose from jumping between subjects in multi-person scenarios, particularly when subjects change their relative positions, become occluded, or enter and exit the frame. To accomplish this, the 2D pose estimation module 308 may use a custom tracking algorithm 408 that matches 2D pixel locations of the estimated 2D human pose across frames. When multiple human poses are detected in the first frame, the average confidence score across all joints may be calculated and ranked for each detected pose. The pose with the highest average confidence score may be selected as the primary tracking target for the video segment. Alternatively, if only one pose is detected in the first frame of the RGB video 402, it is automatically set as the primary tracking target. In subsequent frames, the same primary target may be tracked using the body center of each detected pose, calculated by averaging the 2D coordinates of all main body joints (i.e., COCO-WholeBody keypoints excluding face and hand keypoints). For each detected pose's body center, the 2D pose estimation module 308 may calculate its 2D Euclidean distance to the center of the primary tracking target from the previous frames. The subject with the lowest average distance over the last four frames may be assigned as the primary tracking target for this new frame. The custom tracking algorithm 408 enables the 2D pose estimation module 308 to consistently track the same person throughout the entire RGB video 402, allowing it to handle complex multi-person videos in real industrial settings and providing a solid foundation for subsequent ergonomic risk assessment.

Module #2: 3D Pose Estimation from 2D Poses

With the estimated 2D pose sequences from Module #1 as input, the 3D pose estimation module 310 may exploit spatial relationships between pose keypoints and the temporal relationships between consecutive frames using at least one deep learning model. For example, a 3D motion analysis may be carried out using deep learning to capture both local and global temporal dependencies within motion sequences. Local and global temporal dependencies generally refer to the relationships and patterns in data across different spans of time in a motion sequence. More specifically, local temporal dependencies generally refer to the relationships or patterns between adjacent or nearby time steps in a motion sequence. For example, in a human motion sequence (e.g., walking), the position of a foot at time t is directly related to its position at time t−1 and t+1. When clapping, the motion of one hand at a specific time step strongly depends on its position just before or after that time. Local dependencies capture short-term correlations, like small, immediate movements or changes that are influenced by recent actions. On the other hand, global temporal dependencies describe relationships or patterns that span a long duration across the motion sequence. These include interactions between time steps that are far apart in the sequence. For example, when throwing an object, the initial wind-up motion impacts the release and follow-through phases much later. Global dependencies capture long-term correlations, such as planned, complex actions or overarching trends across the sequence. They are essential for understanding the full context of motion over extended periods. Local temporal dependencies may be determined by convolutional approaches (e.g., temporal convolution) or short-window processing within the sequence, and are used for analyzing actions where fine-grained, moment-to-moment details are critical. Global temporal dependencies may be determined more effectively by transformer-based models because self-attention may weigh and link relationships between distant time steps, and are essential for complex tasks requiring understanding of an action's full sequence.

In one embodiment, the deep learning model used by the 3D pose estimation module 310 may be trained on material-handling task motions commonly observed in labor-intensive industries, such as manufacturing. As a result, the 2D-to-3D pose estimation model of the present disclosure gains a unique advantage over models trained on generic motion datasets, making it more effective for industrial applications where material-handling tasks are common.

According to one implementation, MotionBert, which builds upon transformer architecture, may be selected for its leading performance on the Human3.6M benchmark dataset. For the training dataset, VEHS-7M may be selected which is large-scale 3D motion capture dataset featuring 10 subjects performing 9 typical material-handling tasks such as lifting, carrying, pushing, and assembling. In one embodiment, the VEHS-7M dataset may include 19.4 hours of video footage with 2D and 3D human pose annotations.

Figures 5, 6:
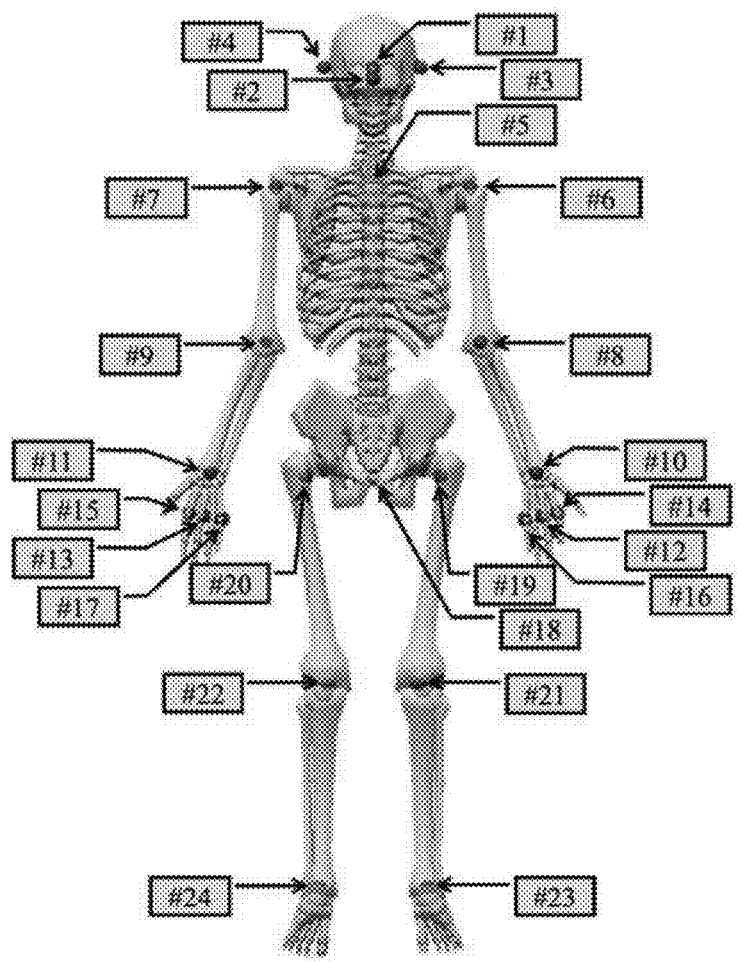
FIG. 5 illustrates a selected plurality of keypoints for 3D pose estimation model training, according to an exemplary aspect of the present disclosure.
FIG. 6 illustrates a plurality of keypoint locations, according to an exemplary aspect of the present disclosure.

According to some embodiments, Module #2 may include three steps. First, the 3D pose estimation module 310 may refine the 133 detected 2D COCO-WholeBody keypoints down to 24 keypoints crucial for subsequent 3D angle calculations. For example, an example list of the 24 keypoints is shown in FIG. 5 and visualized in FIG. 6. Specifically, 15 keypoints may be selected from the standard 17 in the COCO-Pose format, excluding the two eye keypoints because they provide redundant 3D information already captured by the ear and nose keypoints. From these 15 keypoints, sufficient 3D information may be determined to calculate the neck, back, shoulder, elbow, and knee joint angles. To capture wrist angles, the 3D pose estimation module 310 may identify 4 additional hand keypoints at the metacarpophalangeal joints of the index (MCP2) (#14 and #15 in FIG. 6) and little fingers (MCP5) (#16 and #17 in FIG. 6) on both hands. These additional keypoints on the hand extremities may allow the 3D pose of the present disclosure to capture the hand movements relative to the forearm. Moreover, 5 calculated keypoints (i.e., head center, shoulder center, hip center, left hand, and right hand) may be included as reference keypoints to streamline angle calculation steps. The following formulas may be used to calculate these 3D keypoints. With these 24 keypoints, the 3D pose estimation module 310 may establish a solid foundation for subsequent angle and posture score calculations while removing redundant 2D COCO-WholeBody face and hand keypoints.

$P_{Head\_Center}$=Midpoint(LEar,REar)

$P_{Shoulder\_Center}$=Midpoint(LShoulder,RShoulder)

$P_{Hip\_Center}$=Midpoint(LHip,RHip)

$P_{LHand}$=Midpoint(LMCP2,LMCP5)

$P_{RHand}$=Midpoint(RMCP2,RMCP5)

Next, in accordance with certain implementations, a MotionBert model may be trained from scratch using the VEHS-7M MoCap dataset videos, along with 2D and 3D human pose annotations. An example training process may be conducted in two stages. The first stage may involve pretraining using the ground truth 2D poses as model input. In the second stage, the 3D pose estimation module 310 may first carry out RTMPose inference on the dataset videos and use the estimated 2D poses as model inputs. Both stages may be trained under the same hyperparameters for 120 epochs with a learning rate of 0.002, in one embodiment.

Using the trained MotionBert model, the 3D pose estimation module 310 may infer the 24-keypoint 3D human pose from the estimated 2D human poses generated in Module #1. Each input 2D pose video may be initially divided into segments of 243-frame clips (approximately 8 seconds at 30 fps frame rate) and normalized within the range of [−1, 1].

A 2D RGB video is represented as a 4D tensor of shape: frames, height, width, channels, where frames define the total number of frames in the video, height and width are the spatial dimensions of each frame, and channels=3 (for RGB color channels). The total number of frames in a video input may include T frames and the total number of clips C may be T/n, where n=243 or any selected number. Each clip is duration=frames/fps=243/30≈8.1 seconds. If the total number of frames T is not divisible by n, the extra frames that do not form a complete clip may be discarded. Alternatively, in handling the remainder frames, one may zero-pad or repeat frames to create a final full-length clip or process the remaining frames as a smaller, standalone clip. As a result, each clip is of size (243,H,W,3).

Normalizing the 243-frame clips to a range of [−1,1] may adjust the pixel intensity values (or other features) in each clip so that they are scaled and shifted to lie within the interval [−1, 1]. This preprocessing is carried out for deep learning models to improve training stability and performance. Specifically, the normalization standardizes the input video 402 to ensure all data clips are on a consistent scale and reduces the effects of varying lighting conditions or camera quality in videos. Normalized values speed up gradient descent by avoiding disproportionately large or small updates during backpropagation of the deep learning model and allows neural networks to learn faster and achieve better convergence.

Assuming the pixel values are initially in the range [a, b] (e.g., 0 to 255 for 8-bit RGB images), the normalization formula is:

$$x_{nomralized} = 2 \times \frac{x-a}{b-a} - 1,$$

where a is the minimum possible pixel value (e.g., 0 for standard images), and b is the maximum possible pixel value (e.g., 255 for 8-bit images). The result, $x_{normalized}$ will then lie in the range [−1,1]. Alternatively, a mean and standard deviation normalization process may be used. Many deep learning models (e.g., ReLU or tanh activations) may benefit from normalized input in the [−1,1] range. For visualization or inverse preprocessing, denormalization can be applied:

$$x_{original} = \frac{x_{normalized}+1}{2} \times (b-a) + a.$$

In one implementation, these preprocessed clips may be input into the trained MotionBert model. MotionBert exploits both temporal and spatial relationships among the selected human keypoints to estimate the 3D pose for each frame. In one aspect, the output 3D inference results may be provided in pixel units. Since scale may be irrelevant for joint angle calculations, pixel-based measurements may be sufficient for the vision-based ergonomic risk assessment pipeline of the present disclosure.

Module #3: Joint Angle and Ergonomic Risk Assessment Score Calculation from 3D Poses After obtaining the 3D human pose, in an embodiment, the joint angle and risk score calculation engine 312 may be configured to calculate ergonomic joint angles and utilize a custom posture risk table to perform ergonomic risk assessment. For example, the vision-based pose estimation pipeline of the present disclosure may provide 24 3D keypoints. This limited number of keypoints may present challenges for joint angle calculations. In particular, due to the absence of 3D positions on the sides of the elbow and shoulder, there may not be enough 3D information to calculate shoulder and wrist rotations. In other cases, certain keypoints, such as the $7^{th}$ cervical vertebra (C7), posterior superior iliac spine (PSIS), and head top (HDTP), which are crucial for the original angle calculation, may not be included in the dataset. As a result, approximations may be made by the joint angle and risk score calculation engine 312 using nearby available 3D keypoints.

Despite the simplification, the selected set of 24 keypoints may still provide more 3D information for joint angle calculation than typical simplified joint center poses, such as the 17-keypoint pose from the commonly used Human3.6M dataset. As a result, the joint angle and risk score calculation engine 312 may capture and determine more intricate joint angles compared to applications built upon simplified datasets such as Human3.6M while presenting the results in definitions that are more familiar to ergonomists, as shown in the table 700 of FIG. 7. For instance, the joint angle and risk score calculation engine 312 may decompose the 3D angles for the neck into flexion, lateral bend, and rotation rather than calculating them as a single combined 3D angle that cannot distinguish between the different joint movements. Similarly, the joint angle and risk score calculation engine 312 may decompose the shoulder joint angle into humeral elevation and horizontal abduction. Furthermore, by including additional keypoints on the hand extremities, which are absent in the Human3.6M dataset, the joint angle and risk score calculation engine 312 may calculate wrist flexion and deviation angles. In summary, the keypoint set of the present disclosure enables the calculation of additional joint angles, including neck flexion, neck lateral bend, neck rotation, wrist flexion, and wrist deviation angles, which cannot be calculated from the simplified 17-keypoint pose representation used in Human3.6M, as illustrated in FIG. 7. These additional angles are essential for ergonomic risk assessments.

FIGS. 8(A), 8(B), 8(C), 8(D), 8(E), and 8(F) respectively illustrate the angle calculations of a number of identified keypoints based on the 24 estimated 3D keypoints of the present disclosure.

Neck Angle Calculations

Figure 8C:
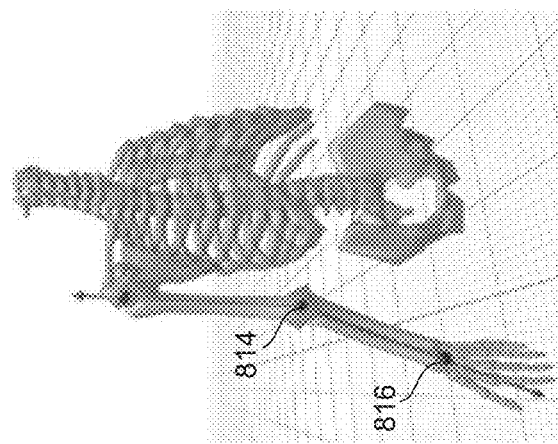
FIG. 8(C) illustrates an example coordination system for calculating elbow angles, according to an exemplary aspect of the present disclosure.

Neck flexion/extension may be calculated from 5 detected 3D body keypoints (i.e., head center, nose, right ear, shoulder center, hip center). Referring to FIG. 8(A), the origin of the head coordinate system may be defined as the head center keypoint 802. A transverse head segment plane is created using the head center 802, right ear 804, and the nose keypoint 806. The Y-axis 808 of the head segment may be defined as the vector perpendicular to the transverse plane pointing in the cranial direction.

$$V_{head\_Y\_axis} = \text{Plane\_norm}(V_{(Head\_Center,Nose)}, V_{(Head\_Center,REar)})$$

The X-axis 810 may be defined as the vector from the head center 802 to the nose keypoint 806.

$$V_{head\_X\_axis} = V_{(Head\_Center, Nose)}$$

The back vector may be defined from the shoulder center to the hip center.

$$V_{back} = V_{(Shoulder\_Center, Hip\_Center)}$$

For angle calculation, the neck flexion/extension may be calculated by projecting the back vector onto the X-Y plane of the head coordinate system.

$$\hat{N}_{head\_XY\_plane} = \text{Plane\_norm}(V_{head\_X\_axis}, V_{head\_Y\_axis})$$

$$V_{back\_XY\_project} = \text{Project}(V_{back}, \hat{N}_{head\_XY\_plane})$$

Neck flexion = Angle($V_{back\_XY\_project}, V_{head\_Y\_axis}$)

Shoulder Angle Calculations

Figure 8B:
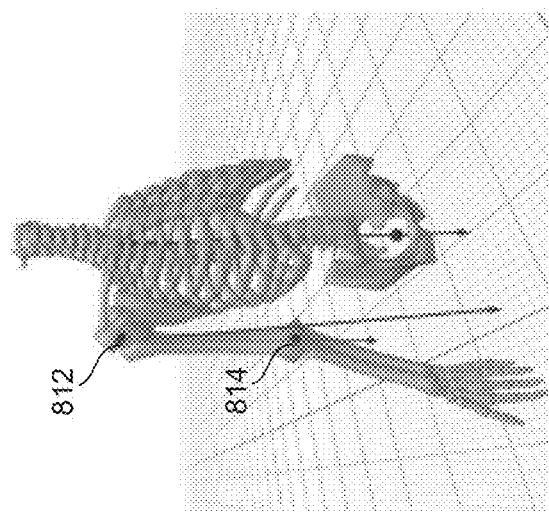
FIG. 8(B) illustrates an example coordination system for calculating shoulder angles, according to an exemplary aspect of the present disclosure.
Figure 8A:
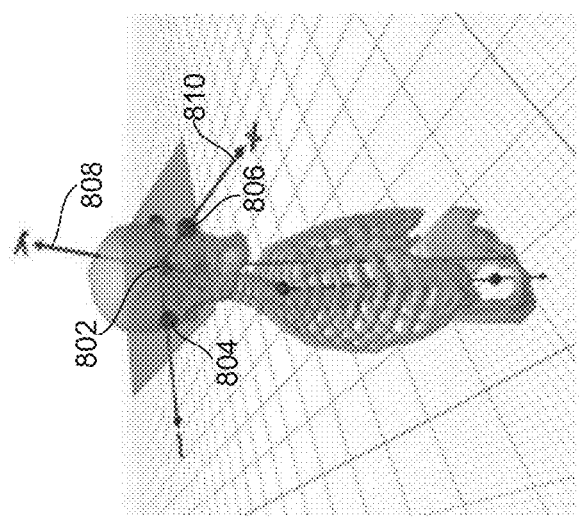
FIG. 8(A) illustrates an example coordination system for calculating neck angles, according to an exemplary aspect of the present disclosure.

The shoulder humeral elevation may be calculated from 2 detected 3D body keypoints (i.e., shoulder 812 and elbow 814) and the back vector $V_{back}$, as illustrated in FIG. 8(B). The humerus vector may be defined from the shoulder 812 to the elbow joint 814.

$$V_{humerus} = V_{(Shoulder, Elbow)}$$

The shoulder humeral elevation may be calculated as the angle between the back and humerus vectors.

Shoulder elevation = Angle($V_{humerus}, V_{back}$)

Elbow Angle Calculations

The elbow flexion angle may be calculated from 2 detected 3D body keypoints (i.e., wrist and elbow) and the humerus vector $V_{humerus}$ as illustrated in FIG. 8(C). The forearm vector may be defined from the elbow 814 to the wrist joint 816.

$$V_{forearm} = V_{(Elbow, Wrist)}$$

Elbow flexion may be calculated as the angle between the forearm and humerus vectors.

Elbow flexion = Angle($-V_{humerus}, V_{forearm}$)

Wrist Angle Calculations

Figure 8F:
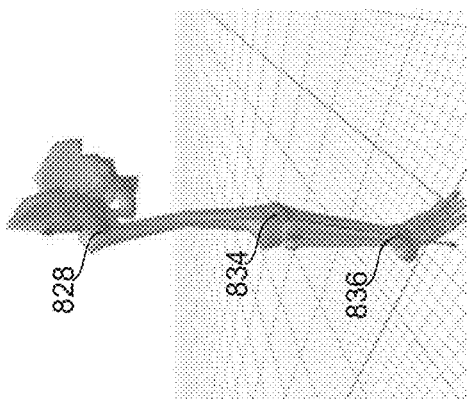
FIG. 8(F) illustrates an example coordination system for calculating knee angles, according to an exemplary aspect of the present disclosure.
Figure 8E:
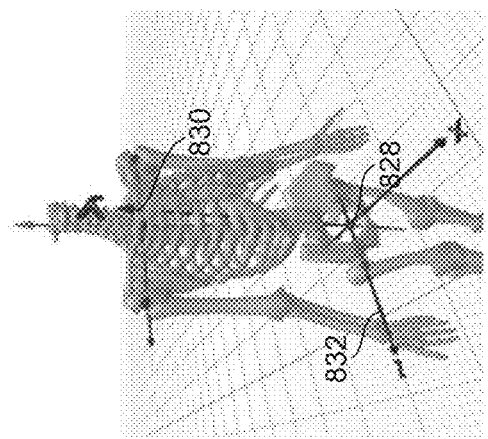
FIG. 8(E) illustrates an example coordination system for calculating back angles, according to an exemplary aspect of the present disclosure.
Figure 8D:
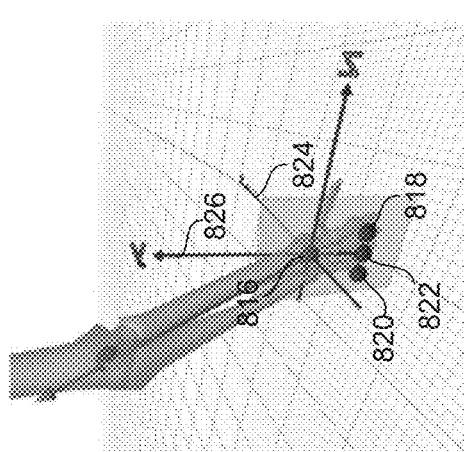
FIG. 8(D) illustrates an example coordination system for calculating wrist angles, according to an exemplary aspect of the present disclosure.

Referring now to FIG. 8(D), the wrist flexion/extension may be calculated from 3 detected 3D body keypoints (i.e., MCP2, MCP5, wrist) and the forearm vector $V_{forearm}$. Using the right wrist as example, the origin of the wrist coordinate system may be defined as right wrist keypoint 816. A coronal hand segment plane may be created using the finger keypoints RMCP2 818 and RMCP5 820 as well as the wrist joint center 822. The X-axis 824 of the hand segment may be defined as the vector perpendicular to the coronal plane pointing in the anterior direction.

$$V_{wrist\_X\_axis} = \hat{N}_{wrist\_YZ\_plane} = \text{Plane\_norm}(V_{(RMCP2, RMCP5)}, V_{(RMCP2, RWrist)})$$

The Y-axis 826 may be defined as the vector from the center of the finger keypoints to the wrist joint center 816.

$$V_{wrist\_Y\_axis} = V_{(Midpoint(RMCP2, RMCP5), RWrist)}$$

For angle calculation, the wrist flexion/extension may be calculated by projecting the forearm vector onto the X-Y plane of the hand coordinate system.

$$\hat{N}_{wrist\_XY\_plane} = \text{Plane\_norm}(V_{wrist\_X\_axis}, V_{wrist\_Y\_axis})$$

$$V_{forearm\_XY\_project} = \text{Project}(-V_{forearm}, \hat{N}_{wrist\_XY\_plane})$$

Wrist flexion = Angle($V_{forearm\_XY\_project}, V_{wrist\_Y\_axis}$)

Back Angle Calculations

Back flexion/extension, lateral flexion/extension, and rotation may be calculated from 5 detected 3D body keypoints (i.e., hip center, left hip, right hip, left shoulder, right shoulder) and a reference up direction in the world coordinate frame. As illustrated in FIG. 8(E), the origin of the back coordinate system may be defined as the hip center keypoint 828. The Y-axis 830 of the back coordinate system may be defined as the reference up direction.

$$V_{back\_Y\_axis} = (0, 0, 1)$$

A transverse plane may be created perpendicular to the Y-axis 830 and passes through the hip center keypoint 828.

$$\hat{N}_{back\_XZ\_plane} = -V_{back\_Y\_axis}$$

The Z-axis 832 may be defined as the left-to-right hip vector's projection on the transverse plane.

$$V_{back\_Z\_axis} = \hat{N}_{back\_XY\_plane} = \text{Project}(V_{(LHip, RHip)}, \hat{N}_{back\_XZ\_plane})$$

For angle calculation, the back flexion/extension may be calculated by projecting the back vector onto the X-Y plane of the back coordinate system.

$$\hat{N}_{back\_XY\_plane} = \text{Project}(V_{(LHip, RHip)}, \hat{N}_{back\_XZ\_plane})$$

$$V_{back\_XY\_project} = \text{Project}(-V_{back}, \hat{N}_{back\_XY\_plane})$$

Back flexion = Angle($V_{back\_XY\_project}, V_{back\_Y\_axis}$)

Similarly, the lateral flexion/extension can be calculated as the Y-Z plane projection.

$$\hat{N}_{back\_YZ\_plane} = \text{Plane\_norm}(V_{back\_Y\_axis}, V_{back\_Z\_axis})$$

$$V_{back\_YZ\_project} = \text{Project}(-V_{back}, \hat{N}_{back\_YZ\_plane})$$

Back lateral flexion = Angle($V_{back\_YZ\_project}, V_{back\_Y\_axis}$)

The back rotation angle may be calculated as the projected rotation between the left-to-right hip direction vector and the left-to-right shoulder direction vector.

Back rotation = Rot_angle(LHip, RHip, LShoulder, RShoulder)

Knee Angle Calculations

The knee flexion angle may be calculated from 3 detected 3D body keypoints (i.e., hip 828, knee 834, and ankle 836), as illustrated in FIG. 8(F). The femur vector may be defined from the hip 828 to the knee joint 834.

$$V_{femur} = V_{(Hip, Knee)}$$

The tibia vector may be defined from the knee 834 to the ankle joint 836.

$$V_{tibia} = V_{(Knee, Ankle)}$$

Elbow flexion may be calculated as the angle between the femur and tibia vectors.

Elbow flexion = Angle($-V_{femur}, V_{tibia}$)

In addition to the primary angle calculations described above with respect to FIGS. 8(A)-8(F), the 24-keypoint 3D human pose may also support the calculation of three supplementary angles for the neck and wrist joints, thereby offering additional information about the posture and may be valuable for future ergonomic risk assessments.

Neck Lateral Bend and Rotation Angle Calculations

Using the head coordinate system, the Z-axis may be defined using the cross product of the other two axes.

$$V_{head\_Z\_axis} = \text{Plane\_norm}(V_{head\_X\_axis}, V_{head\_Y\_axis})$$

The lateral neck bend may be calculated as the Y-Z plane projection.

$$\widehat{N}_{head\_YZ\_plane}=\text{Plane\_norm}(V_{head\_Y\_axis}, V_{head\_Z\_axis})$$

$$V_{back\_YZ\_project}=\text{Project}(V_{back}, \widehat{N}_{head\_YZ\_plane})$$

Neck lateral bend=$\text{Angle}(V_{back\_YZ\_project}, V_{head\_Y\_axis})$

The neck rotation angle may be calculated as the projected rotation between the left-to-right ear head direction vector and the left-to-right shoulder direction vector.

Neck rotation=Rot_angle(LEar,REar,LShoulder, RShoulder)

Shoulder Horizontal Abduction Angle Calculations

The shoulder horizontal abduction/adduction may be calculated from 4 detected 3D body keypoints (i.e., shoulders, elbow, and the hip center). Using the right shoulder as an example, the origin of the shoulder coordinate system is defined as the right shoulder keypoint 812 as shown in FIG. 8(B). A coronal torso segment plane may be created using the two shoulder keypoints and the hip center keypoint 828.

$$\widehat{N}_{shoulder\_YZ\_plane}=\text{Plane\_norm}(V_{(Lshoulder,Rshoulder)}, V_{(Lshoulder,Hip\_Center)})$$

The X-axis of the shoulder coordinate system may be defined as the vector perpendicular to the coronal plane pointing in the anterior direction.

$$V_{shoulder\_X\_axis}=\widehat{N}_{shoulder\_YZ\_plane}$$

The Z-axis of the shoulder coordinate system may be defined as the vector LShoulder-RShoulder.

$$V_{shoulder\_Z\_axis}=V_{(LShoulder,RShoulder)}$$

The right humerus vector may be defined from the right shoulder 812 to the right elbow keypoint 814.

$$V_{humerus}=V_{(RShoulder,RElbow)}$$

The shoulder horizontal abduction/adduction may be calculated by projecting the humerus vector onto the X-Z plane of the shoulder coordinate system.

$$\widehat{N}_{shoulder\_XZ\_plane}=\text{Plane\_norm}(V_{shoulder\_X\_axis}, V_{shoulder\_Z\_axis})$$

$$V_{humerus\_XZ\_project}=\text{Project}(V_{humerus}, \widehat{N}_{shoulder\_XZ\_plane})$$

Shoulder horizontal abduction=Angle $(V_{humerus\_XZ\_project}, V_{shoulder\_X\_axis})$

Wrist Deviation Angle Calculations

Using the wrist coordinate system, the wrist deviation may be calculated as the Y-Z plane projection.

$$V_{forearm\_YZ\_project}=\text{Project}(-V_{forearm}, \widehat{N}_{wrist\_YZ\_plane})$$

Wrist deviation=$\text{Angle}(V_{forearm\_YZ\_project}, V_{wrist\_Y\_axis})$

Midpoint Formula

The midpoint formula, denoted by Midpoint $(P_1, P_2, \ldots, P_n)$, may calculate the center point of two or more 3D points. Specifically, it performs the following operation:

$$\text{Midpoint}(P_1, P_2, \ldots, P_n) = \frac{P_1 + P_2 + \ldots + P_n}{n} = \left( \frac{x_1 + x_2 + \ldots + x_n}{n}, \frac{y_1 + y_2 + \ldots + y_n}{n}, \frac{z_1 + z_2 + \ldots + z_n}{n} \right)$$

Where $(x_i, y_i, z_i)$ is the 3D coordinate of $P_i$

Plane Normal Formula

The plane normal formula, denoted by Plane_norm($V_1$, $V_2$), finds the normal vector that is orthogonal to the plane created by 3D vectors $V_1$ and $V_2$.

$$\text{Plane\_norm}(V_1, V_2) = \frac{V_1 \times V_2}{\|V_1 \times V_2\|}$$

Projection Formula

The projection formula, denoted by Project (V, $\widehat{N}$), projects a vector V onto a plane with the normal unit vector $\widehat{N}$, forming a new 3D vector.

$$\text{Project}(V, \widehat{N}) = V - (V \cdot \widehat{N}) \cdot \widehat{N}$$

Vector Angle Formula

The vector angle formula, denoted by Angle ($V_1$, $V_2$, $V_{dir}$), may calculate the angle between 3D vector $V_1$ and $V_2$.

$$\text{Angle}(V_1, V_2) = \arccos\left( \frac{V_1 \cdot V_2}{\|V_1 \cdot V_2\|} \right)$$

Rotation Angle Formula

The rotation angle formula, denoted by Rot_angle($P_1$, $P_2$, $P_3$, $P_4$), calculates the rotation angle between 3D vectors $V_{(P_1,P_2)}$ and $V_{(P_3,P_4)}$.

$$\widehat{N}_1 = \text{Plane\_norm}(V_{(P_1,P_2)}, V_{(P_1, Midpoint(P_3,P_4))})$$

$$\widehat{N}_2 = \text{Plane\_norm}(V_{(P_3,P_4)}, V_{(P_3, Midpoint(P_1,P_2))})$$

$$\text{Rot\_angle}(P_1, P_2, P_3, P_4) = \arccos\left( \frac{\widehat{N}_1 \cdot \widehat{N}_2}{\|\widehat{N}_1 \cdot \widehat{N}_2\|} \right) * \text{sign}\left( V_{(P_1,P_3)} \cdot \widehat{N}_2 \right)$$

Posture Score Calculation

Once the joint angles are calculated, the results may be used by the joint angle and risk score calculation engine 312 of the server system 214 to assess posture scores for each frame and joint according to FIG. 9. Based on the joint angle range, each body joint receives a posture score ranging from 0 to 3, with 0 indicating minimal ergonomic risk level and 3 indicating high ergonomic risk level. A final posture score for each body joint may be determined based on the highest posture score observed during the video for that joint. In further embodiments, other factors, such as duration, frequency, and force, also contribute to the overall ergonomic risk assessment.

The performance of the proposed pipeline may be evaluated in three ways. First, 3D pose estimation accuracy may be tested using other lab-collected dataset, comparing the results against ground truth 3D poses obtained from accurate motion capture systems. This test may directly evaluate the pipeline's capability to estimate accurate 3D pose keypoints from monocular camera videos, which serves as the basis for the subsequent joint angle calculation and ergonomic risk assessment. Second, the pipeline's joint angle estimation accuracy may be assessed using the same ground truth lab data. This test evaluates how the accuracy of 3D pose estimation translates into joint angle estimation accuracy, which directly impacts the subsequent manual ergonomic risk assessment tools. Finally, the pipeline has been tested on real-world industry videos to analyze real-world conditions and provide reliable ergonomic risk assessment results.

3D Pose Estimation Accuracy 3D human pose estimation from monocular videos is the foundation of the disclosed vision-based ergonomic risk assessment pipeline, with its accuracy directly impacting subsequent joint angle calculations and ergonomic risk assessment. In one implementation, the Mean Per Joint Position Error (MPJPE) and the Procrustes-aligned Mean Per Joint Position Error (PA-MPJPE) may be selected testing the accuracy and effectiveness of the pipeline. For example, the MPJPE evaluates the average 3D Euclidean distance between the estimated 3D joint positions and the ground truth positions, offering a direct measure of 3D pose estimation accuracy. The PA-MPJPE calculates the same average position error but after applying Procrustes alignment, where the estimated pose undergoes a rigid transformation to be aligned as closely as possible with the ground truth pose. The PA-MPJPE focuses on the local relative position errors between joints, ignoring global translation and orientation of the estimated 3D pose. The PA-MPJPE may be a strong indicator of the accuracy of joint angle estimations that rely on relative joint positions (i.e., all joint angles except back bending angles, which are relative to the gravity direction), as it isolates the relative structure of the 3D pose without being influenced by the overall body position or orientation in space. As shown in the following table, the trained vision-based pipeline of the present disclosure achieved an MPJPE of 48.83 mm and a PA-MPJPE of 37.04 mm for the estimated 24-keypoint 3D pose when evaluated on the VEHS-7M material handling motion test sets. The unit of measurement mm (millimeters) is often used in 3D pose estimation because 3D coordinates are typically provided in a real-world metric system, such as millimeters or meters. A MPJPE of 48.83 mm means that, on average, each joint in the predicted 3D skeleton is 48.83 millimeters away from its true position. This is an indicator of how close the model's predictions are to the ground truth. A lower MPJPE indicates better accuracy.

| Task | #1 | #2 | #3 | #4 | #5 | #6 | #7 | #8 | #9 | Average |
|---|---|---|---|---|---|---|---|---|---|---|
| MPJPE | 45.68 | 47.62 | 56.53 | 43.10 | 45.89 | 44.04 | 50.69 | 52.77 | 53.19 | 48.83 |
| PA-MPJPE | 34.20 | 36.62 | 43.76 | 33.39 | 33.91 | 35.21 | 38.42 | 39.78 | 38.09 | 37.04 |

An example test set may include human motions performing nine typical material handling tasks, such as pushing, pulling, carrying, lifting, poking, and assembling, all designed to reflect real-world industry task motions. The motions also feature challenging and awkward postures, such as backward leaning, body twisting, and out-of-balance positions-risky postures crucial to capture for industrial applications but rarely represented in existing generic human pose test sets such as the Human3.6M test set. In one embodiment, the test set data may be captured from four different camera heights, simulating common industrial video viewpoints ranging from hand-held positions to surveillance camera vantage points. By evaluating on a curated test set that closely represents the challenging scenarios in the intended industrial use case, the results can more accurately reflect the real-world performance of the proposed pipeline.

The 24-keypoint human pose in the VEHS-7M test set of the present disclosure includes additional keypoints on body extremities, such as hands and ears, essential for joint angle calculations. These keypoints are often small and occluded in video frames, making their 3D positions more difficult to estimate than the other body keypoints. Even with this more challenging task, the trained 3D pose model of the present disclosure has demonstrated comparable 3D pose estimation accuracy to the established benchmark.

Joint Angle Estimation Accuracy

Furthermore, the mean absolute angle error between the joint angles calculated from the estimated 3D pose and those from the ground truth 3D pose may be determined. The angle estimation performance of the present disclosure has been evaluated across two categories of motion: simple task motions, similar to those in the Human3.6M dataset, and complex task motions that reflect manual material handling tasks commonly found in labor-intensive industries such as manufacturing, construction, transportation, and warehousing. For simple task motions, a mean absolute angle error of 2.61° may be obtained when averaging across the neck, back, shoulder, elbow, and knee joint angles, as shown below.

| Joint | Angle | Mean Abs. Angle Diff. | Mean Abs. Posture Score Diff. |
|---|---|---|---|
| Neck | Flexion(+)/Extension(−) | 2.52° | 0.16 |
| Shoulder | Humeral Elevation | 2.82° | 0.28 |
| Elbow | Flexion | 3.92° | 0.15 |
| Back | Flexion(+)/Extension(−) | 1.23° | 0.20 |
| Knee | Flexion | 2.55° | 0.02 |
|  | Average | 2.61° | 0.16 |

For complex task motions, despite their increased difficulty for the pose estimation model, the pipeline maintained a comparable mean absolute angle error of 2.94°, as shown below.

| Joint | Angle | Mean Absolute Angle Diff. | Mean Absolute Posture Score Diff. |
|---|---|---|---|
| Neck | Flexion(+)/Extension(−) | 2.85° | 0.28 |
| Shoulder | Humeral Elevation | 3.04° | 0.35 |
| Elbow | Flexion | 4.20° | 0.17 |
| Back | Flexion(+)/Extension(−) | 1.46° | 0.23 |
| Knee | Flexion | 3.14° | 0.20 |
|  | Average | 2.94° | 0.24 |

The present disclosure may also calculate wrist joint angles using the hand, wrist, and elbow keypoints. Hand and wrist keypoints are inherently more challenging to estimate, as they are often small and occluded in video frames. The close proximity between these keypoints also amplifies errors in 3D angle calculations, where minor inaccuracies in 3D pose estimation can lead to more significant joint angle errors. Despite these challenges, the present disclosure has achieved a mean absolute angle error of 7.74° for wrist angles. Further refinement of wrist angle estimation, such as additional training of 2D and 3D pose models using hand-specific data, may improve its effectiveness in vision-based ergonomic risk assessment. Averaging across all joints, the mean difference of the estimated posture score was 0.16 for simple task motions and 0.24 for complex task motions.

Ergonomic Risk Assessment Test on Real Industrial Videos

According to some implementations, to evaluate the real-world performance of the proposed vision-based ergonomic risk assessment pipeline, 12 industry videos featuring factory workers performing manual tasks may be obtained and used. These test cases have been selected to represent challenging real-world industry conditions, including heavy occlusion, multi-person scenarios, uncommon postures, varying camera distances (both far and close-up), zooming, and moving cameras. FIGS. 10(A), 10(B), 11(A), 11(B), 12(A), 12(B), 13(A), and 13(B) illustrate example frames of these challenging conditions, along with the corresponding 2D and 3D human pose estimates output from the pipeline 100 of the present disclosure. For example, FIGS. 11(A) and 11(B) respectively illustrate 2D and 3D human pose estimate outputs based on two example video frames showing heavy occlusions. FIGS. 12(A) and 12(B) respectfully illustrate 2D and 3D human pose estimate outputs based on two example video frames showing far away targets. FIGS. 13(A) and 13(B) respectfully illustrate 2D and 3D human pose estimate outputs based on two example video frames relating to multi-person scenarios.

Unless specifically stated otherwise as apparent from the foregoing disclosure, it is appreciated that, throughout the present disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

As used herein, the term "comprising" is not intended to be limiting, but may be a transitional term synonymous with "including," "containing," or "characterized by." The term "comprising" may thereby be inclusive or open-ended and does not exclude additional, unrecited elements or method steps when used in a claim. For instance, in describing a method, "comprising" indicates that the claim is open-ended and allows for additional steps. In describing a device, "comprising" may mean that a named element(s) may be essential for an embodiment or aspect, but other elements may be added and still form a construct within the scope of a claim. In contrast, the transitional phrase "consisting of" excludes any element, step, or ingredient not specified in a claim. This is consistent with the use of the term throughout the specification.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material. None is admitted to be prior art.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

The invention claimed is:

1. A vision-based three-dimensional (3D) pose estimation system for ergonomic risk assessment, the system comprising:
    a computing device, comprising:
        a non-transitory computer readable storage medium storing instructions; and
        a processor coupled to the non-transitory computer readable storage medium and configured to execute the instructions to:
            obtain a monocular video capturing motions of a subject performing at least one working activity for a selected duration of time,
            perform a whole-body two dimensional (2D) pose estimation based at least on extracted frames of the monocular video,
            perform a whole-body three dimensional (3D) pose estimation based at least on the whole-body 2D pose estimation by using a deep learning model to determine spatial relationships between pose keypoints and temporal relationships between consecutive frames of the monocular video, and determine a plurality of keypoints for 3D joint angle calculations, wherein the deep learning model is trained on a material-handling task motions dataset, wherein the plurality of keypoints include a first portion of keypoints relating to neck, back, shoulder, elbow, and knee joint angles, a second portion of keypoints relating to wrist angles, and a third portion of keypoints relating to head center, shoulder center, hip center, left hand, and right hand angles,
            calculate joint angles based at least on the whole-body 3D pose estimation,
            determine a posture score for each identified joint in each frame of the monocular video, and
            determine an ergonomic risk level of each identified joint based at least upon the posture score.

2. The system of claim 1, wherein the processor is configured to execute the instructions to perform the whole-body 2D pose estimation based at least on extracted frames of the monocular video by identifying a primary target in each segment of the monocular video and tracking the primary target throughout subsequent frames of the monocular video.

3. The system of claim 2, wherein the processor is further configured to execute the instructions to:
    identify a bounding box of each subject instance within each frame of the monocular video;
    in response to identify the bounding box, crop each frame of the monocular video in connection with the bounding box to isolate each subject instance into an individual image segment; and
    extract 2D pixel locations of each keypoint from each cropped subject instance in accordance with a selected whole-body pose estimation deep learning model.

4. The system of claim 3, wherein the processor is further configured to execute the instructions to:
    subsequent to extracting the 2D pixel locations of each keypoint, merge the 2D pixel locations and each keypoint back together into each frame of the monocular video; and
    track a same target instance across frames of the monocular video based at least upon merged 2D pixel locations and each keypoint.

5. The system of claim 4, wherein the processor is further configured to execute the instructions to:
    in response to detecting a single pose in a first frame of the monocular video, set a primary tracking target for each video segment based on the single pose; and
    track the primary tracking target using a body center of the single pose in subsequent frames of the monocular video.

6. The system of claim 1, wherein the joint angles based at least on the whole-body 3D pose estimation include angles of neck flexion, neck lateral bend, neck rotation, shoulder horizontal abduction, wrist flexion, and wrist deviation angles.

7. A vision-based three-dimensional (3D) pose estimation system for ergonomic risk assessment, the system comprising:
    a computing device, comprising:
        a non-transitory computer readable storage medium storing instructions; and
        a processor coupled to the non-transitory computer readable storage medium and configured to execute the instructions to:
            obtain a monocular video capturing motions of a subject performing at least one working activity for a selected duration of time,
            perform a whole-body two dimensional (2D) pose estimation based at least on extracted frames of the monocular video by identifying a primary target in each segment of the monocular video and tracking the primary target throughout subsequent frames of the monocular video,
            identify a bounding box of each subject instance within each frame of the monocular video, in response to identify the bounding box, crop each frame of the monocular video in connection with the bounding box to isolate each subject instance into an individual image segment, extract 2D pixel locations of each keypoint from each cropped subject instance in accordance with a selected whole-body pose estimation deep learning model, subsequent to extracting the 2D pixel locations of each keypoint, merge the 2D pixel locations and each keypoint back together into each frame of the monocular video, track a same target instance across frames of the monocular video based at least upon merged 2D pixel locations and each keypoint, in response to detecting multiple poses in a first frame of the monocular video, calculate an average confidence score across detected joints of the subject, rank each detected pose of the multiple poses based on the average confidence score, select a highest average confidence score of one of the multiple poses as a primary tracking target for each video segment, perform a whole-body three dimensional (3D) pose estimation based at least on the whole-body 2D pose estimation, calculate joint angles based at least on the whole-body 3D pose estimation, determine a posture score for each identified joint in each frame of the monocular video, and determine an ergonomic risk level of each identified joint based at least upon the posture score.

8. A vision-based three-dimensional (3D) pose estimation system for ergonomic risk assessment, the system comprising:

a computing device, comprising:

a non-transitory computer readable storage medium storing instructions; and a processor coupled to the non-transitory computer readable storage medium and configured to execute the instructions to:

obtain a monocular video capturing motions of a subject performing at least one working activity for a selected duration of time, perform a whole-body two dimensional (2D) pose estimation based at least on extracted frames of the monocular video by identifying a primary target in each segment of the monocular video and tracking the primary target throughout subsequent frames of the monocular video, identify a bounding box of each subject instance within each frame of the monocular video, in response to identify the bounding box, crop each frame of the monocular video in connection with the bounding box to isolate each subject instance into an individual image segment, extract 2D pixel locations of each keypoint from each cropped subject instance in accordance with a selected whole-body pose estimation deep learning model, subsequent to extracting the 2D pixel locations of each keypoint, merge the 2D pixel locations and each keypoint back together into each frame of the monocular video, track a same target instance across frames of the monocular video based at least upon merged 2D pixel locations and each keypoint, in response to detecting a single pose in a first frame of the monocular video, set a primary tracking target for each video segment based on the single pose, track the primary tracking target using a body center of the single pose in subsequent frames of the monocular video, calculate a 2D Euclidean distance between the body center and a center of the primary tracking target from a selected plurality of frames, identify one subject with a lowest average distance over the selected plurality of frames, assign the one subject as the primary tracking target for a frame subsequent to the selected plurality of frames, perform a whole-body three dimensional (3D) pose estimation based at least on the whole-body 2D pose estimation, calculate joint angles based at least on the whole-body 3D pose estimation, determine a posture score for each identified joint in each frame of the monocular video, and determine an ergonomic risk level of each identified joint based at least upon the posture score.

9. A computer-implemented method, comprising:

obtaining, by a processor of a computing device, a monocular video capturing motions of a subject performing at least one working activity for a selected duration of time;

performing, by the processor of the computing device, a whole-body two dimensional (2D) pose estimation based at least on extracted frames of the monocular video;

performing, by the processor of the computing device, a whole-body three dimensional (3D) pose estimation based at least on the whole-body 2D pose estimation by using a deep learning model to determine spatial relationships between pose keypoints and temporal relationships between consecutive frames of the monocular video, and determine a plurality of keypoints for 3D joint angle calculations, wherein the deep learning model is trained on a material-handling task motions dataset, wherein the plurality of keypoints include a first portion of keypoints relating to neck, back, shoulder, elbow, and knee joint angles, a second portion of keypoints relating to wrist angles, and a third portion of keypoints relating to head center, shoulder center, hip center, left hand, and right hand angles;

calculating, by the processor of the computing device, joint angles based at least on the whole-body 3D pose estimation;

determining, by the processor of the computing device, a posture score for each identified joint in each frame of the monocular video; and determining, by the processor of the computing device, an ergonomic risk level of each identified joint based at least upon the posture score.

10. The computer-implemented method of claim 9, wherein the performing the whole-body 2D pose estimation based at least on extracted frames of the monocular video comprises identifying a primary target in each segment of the monocular video and tracking the primary target throughout subsequent frames of the monocular video.

11. The computer-implemented method of claim 10, further comprising:
identifying, by the processor of the computing device, a bounding box of each subject instance within each frame of the monocular video;
in response to identify the bounding box, cropping, by the processor of the computing device, each frame of the monocular video in connection with the bounding box to isolate each subject instance into an individual image segment; and
extracting, by the processor of the computing device, 2D pixel locations of each keypoint from each cropped subject instance in accordance with a selected whole-body pose estimation deep learning model.

12. The computer-implemented method of claim 11, further comprising:
subsequent to extracting the 2D pixel locations of each keypoint, merging the 2D pixel locations and each keypoint back together into each frame of the monocular video; and
tracking a same target instance across frames of the monocular video based at least upon merged 2D pixel locations and each keypoint.

13. The computer-implemented method of claim 12, further comprising:
in response to detecting a single pose in a first frame of the monocular video, setting a primary tracking target for each video segment based on the single pose; and
tracking the primary tracking target using a body center of the single pose in subsequent frames of the monocular video.

14. The computer-implemented method of claim 9, wherein the joint angles based at least on the whole-body 3D pose estimation include angles of neck flexion, neck lateral bend, neck rotation, shoulder horizontal abduction, wrist flexion, and wrist deviation angles.

15. A computer-implemented method, comprising:
obtaining, by a processor of a computing device, a monocular video capturing motions of a subject performing at least one working activity for a selected duration of time;
performing, by the processor, a whole-body two dimensional (2D) pose estimation based at least on extracted frames of the monocular video by identifying a primary target in each segment of the monocular video and tracking the primary target throughout subsequent frames of the monocular video;
identifying, by the processor, a bounding box of each subject instance within each frame of the monocular video;
in response to identify the bounding box, cropping, by the processor, each frame of the monocular video in connection with the bounding box to isolate each subject instance into an individual image segment;
extracting, by the processor, 2D pixel locations of each keypoint from each cropped subject instance in accordance with a selected whole-body pose estimation deep learning model;
subsequent to extracting the 2D pixel locations of each keypoint, merging, by the processor, the 2D pixel locations and each keypoint back together into each frame of the monocular video;
tracking, by the processor, a same target instance across frames of the monocular video based at least upon merged 2D pixel locations and each keypoint;
in response to detecting multiple poses in a first frame of the monocular video, calculating, by the processor, an average confidence score across detected joints of the subject;
ranking, by the processor, each detected pose of the multiple poses based on the average confidence score;
selecting, by the processor, a highest average confidence score of one of the multiple poses as a primary tracking target for each video segment;
performing, by the processor, a whole-body three dimensional (3D) pose estimation based at least on the whole-body 2D pose estimation;
calculating, by the processor, joint angles based at least on the whole-body 3D pose estimation;
determining, by the processor, a posture score for each identified joint in each frame of the monocular video; and
determining, by the processor, an ergonomic risk level of each identified joint based at least upon the posture score.

16. A computer-implemented method, comprising:
obtaining, by a processor of a computing device, a monocular video capturing motions of a subject performing at least one working activity for a selected duration of time;
performing, by the processor, a whole-body two dimensional (2D) pose estimation based at least on extracted frames of the monocular video by identifying a primary target in each segment of the monocular video and tracking the primary target throughout subsequent frames of the monocular video;
identifying, by the processor, a bounding box of each subject instance within each frame of the monocular video;
in response to identify the bounding box, cropping, by the processor, each frame of the monocular video in connection with the bounding box to isolate each subject instance into an individual image segment;
extracting, by the processor, 2D pixel locations of each keypoint from each cropped subject instance in accordance with a selected whole-body pose estimation deep learning model;
subsequent to extracting the 2D pixel locations of each keypoint, merging, by the processor, the 2D pixel locations and each keypoint back together into each frame of the monocular video;
tracking, by the processor, a same target instance across frames of the monocular video based at least upon merged 2D pixel locations and each keypoint;
in response to detecting a single pose in a first frame of the monocular video, setting, by the processor, a primary tracking target for each video segment based on the single pose;
tracking, by the processor, the primary tracking target using a body center of the single pose in subsequent frames of the monocular video;
calculating, by the processor, a 2D Euclidean distance between the body center and a center of the primary tracking target from a selected plurality of frames;
identifying, by the processor, one subject with a lowest average distance over the selected plurality of frames;
assigning, by the processor, the one subject as the primary tracking target for a frame subsequent to the selected plurality of frames;
performing, by the processor, a whole-body three dimensional (3D) pose estimation based at least on the whole-body 2D pose estimation;

calculating, by the processor, joint angles based at least on the whole-body 3D pose estimation;

determining, by the processor, a posture score for each identified joint in each frame of the monocular video; and determining, by the processor, an ergonomic risk level of each identified joint based at least upon the posture score.

* * * * *